US012782631B2

(12) United States Patent
Bunandar et al.

(10) Patent No.: US 12,782,631 B2
(45) Date of Patent: Nov. 3, 2026

(54) OPTICAL COMMUNICATION SUBSTRATE USING GLASS INTERPOSER

(71) Applicant: Lightmatter, Inc., Boston, MA (US)

(72) Inventors: Darius Bunandar, Boston, MA (US); Shashank Gupta, Newton, MA (US); Jessie Rosenberg, Bedford, MA (US); Clifford Chao, Palo Alto, CA (US); Kuang Liu, Queen Creek, AZ (US); Nicholas C. Harris, Menlo Park, CA (US)

(73) Assignee: Lightmatter, Inc., Mountain View, CA (US)

( * ) Notice: Subject to any disclaimer, the term of this patent is extended or adjusted under 35 U.S.C. 154(b) by 282 days.

(21) Appl. No.: 18/638,820

(22) Filed: Apr. 18, 2024

(65) Prior Publication Data

US 2024/0353614 A1 Oct. 24, 2024

Related U.S. Application Data

(60) Provisional application No. 63/460,578, filed on Apr. 19, 2023.

(51) Int. Cl.
*G02B 6/12* (2006.01)
*G02B 6/30* (2006.01)
(Continued)

(52) U.S. Cl.
CPC ..... *G02B 6/12002* (2013.01); *G02B 6/12004* (2013.01); *G02B 6/30* (2013.01);
(Continued)

(58) Field of Classification Search
CPC ...... G02B 6/43; G02B 6/428; G02B 6/12004; G02B 6/4274; G02B 6/30; G02B 6/4214;
(Continued)

(56) References Cited

U.S. PATENT DOCUMENTS 6,202,165 B1 3/2001 Pine
7,251,386 B1 7/2007 Dickinson et al.
(Continued)

FOREIGN PATENT DOCUMENTS

EP 3 159 721 A1 4/2017
WO WO 2011/143548 A2 11/2011
(Continued)

OTHER PUBLICATIONS

International Search Report and Written Opinion dated Aug. 7, 2024, in connection with International Application No. PCT/US24/25127.

(Continued)

*Primary Examiner* — Michelle R Connelly
(74) *Attorney, Agent, or Firm* — Wolf, Greenfield & Sacks, P.C.

(57) ABSTRACT

Described herein photonic interconnects based on glass interposers. Glass interposers of the types described herein are used to photonically interconnect multiple smaller photonic integrated circuits (PIC), as opposed to using a single, larger PIC. The typical yield of a glass interposer is significantly higher than the yield of a PIC. This is because glass interposers are passive in nature, while PICs include active photonic elements. Active photonic components (e.g., photonic transceivers and switches) tend to be more susceptible to manufacturing defects than passive photonic components (e.g., waveguides and couplers) because active components require additional manufacturing steps (e.g., ion implantation, sputtering, epitaxial growth, etc.). The approach described herein improves performance because instead of having to slice a large number of continuous reticles from a wafer, one can pick and choose reticles known to have yielded.

20 Claims, 22 Drawing Sheets

(51) Int. Cl.

| | |
|---|---|
| ***G02B 6/42*** | (2006.01) |
| ***G02B 6/43*** | (2006.01) |
| ***H04B 10/40*** | (2013.01) |
| ***H04B 10/80*** | (2013.01) |

(52) U.S. Cl.

CPC ............... *G02B 6/428* (2013.01); *G02B 6/43* (2013.01); *H04B 10/40* (2013.01); *H04B 10/802* (2013.01); *G02B 2006/12038* (2013.01)

(58) Field of Classification Search

CPC .... G02B 6/12002; G02B 6/13; G02B 6/4249; H10W 90/724; H10W 90/00; H10W 70/611; H10W 90/701; H10W 70/635; H10W 90/401

See application file for complete search history.

(56) References Cited

U.S. PATENT DOCUMENTS

| | | | | |
|---|---|---|---|---|
| 9,922,887 | B2 | 3/2018 | Vermeulen et al. | |
| 10,921,534 | B2 * | 2/2021 | Dong ................... | G02B 6/4245 |
| 11,036,002 | B2 | 6/2021 | Harris et al. | |
| 12,554,077 | B2 * | 2/2026 | Raghunathan ....... | G02B 6/4206 |
| 2008/0044128 | A1 | 2/2008 | Kish, Jr. et al. | |
| 2008/0089640 | A1 | 4/2008 | Beausoleil | |
| 2011/0073989 | A1 | 3/2011 | Rong et al. | |
| 2011/0128790 | A1 | 6/2011 | Sarin et al. | |
| 2012/0149148 | A1 | 6/2012 | Dallesasse et al. | |
| 2012/0177381 | A1 | 7/2012 | Dobbelaere et al. | |
| 2013/0051725 | A1 | 2/2013 | Shinoda et al. | |
| 2013/0071121 | A1 | 3/2013 | Sharapov et al. | |
| 2013/0209112 | A1 | 8/2013 | Witzens | |
| 2013/0292840 | A1 | 11/2013 | Shoemaker et al. | |
| 2013/0308893 | A1 | 11/2013 | Zuffada et al. | |
| 2014/0040698 | A1 | 2/2014 | Loh et al. | |
| 2014/0043050 | A1 | 2/2014 | Stone et al. | |
| 2014/0264400 | A1 | 9/2014 | Lipson et al. | |
| 2014/0300008 | A1 | 10/2014 | Duan et al. | |
| 2014/0363124 | A1 | 12/2014 | Pelley et al. | |
| 2016/0191188 | A1 | 6/2016 | Butler | |
| 2019/0162901 | A1 | 5/2019 | Yu et al. | |
| 2023/0089096 | A1 | 3/2023 | Collins et al. | |
| 2023/0366913 | A1 * | 11/2023 | Kamineni ............ | G01R 15/242 |
| 2024/0337800 | A1 * | 10/2024 | Yu ....................... | H01S 5/02326 |

FOREIGN PATENT DOCUMENTS

| | | | |
|---|---|---|---|
| WO | WO 2016/008771 | A1 | 1/2016 |
| WO | WO 2019/207363 | A1 | 10/2019 |
| WO | WO 2021/170200 | A1 | 9/2021 |
| WO | WO 2023/049132 | A1 | 3/2023 |

OTHER PUBLICATIONS

Fujikata et al., LSI on-chip optical interconnection with Si nanophotonics. Extended Abstracts of the 2007 International Conference on Solid State Devices and Materials. 2007. pp 276-277.

Grigalunas, Tell Me—What Is Wafer Dicing? Eastern States Components, LLC. Sep. 26, 2017. 2 pages. URL:https://www.escomponents.com/blog/2017/9/26/tell-me-what-is-wafer-dicing [retrieved on Jul. 13, 2020].

Wada, Electronics and Photonics Convergence on Si CMOS Platform. Proceedings of SPIE. 2004;5357:16-24. DOI: 10.1117/12.533807.

* cited by examiner

OPTICAL COMMUNICATION SUBSTRATE USING GLASS INTERPOSER

CROSS-REFERENCE TO RELATED APPLICATION

This application claims the benefit under 35 U.S.C. § 119(e) of U.S. Provisional Patent Application Ser. No. 63/460,578, filed Apr. 19, 2023, and entitled "MULTI-TILE OPTICAL COMMUNICATION SUBSTRATE USING GLASS INTERPOSER," which is hereby incorporated herein by reference in its entirety.

BACKGROUND

Optical interconnects are a type of communication technology that use light signals to transmit data between different components or devices within a system. These interconnects replace traditional electrical connections, such as copper wires or traces on a circuit board, with optical fibers or waveguides. In optical interconnects, data is converted into light signals using optical transmitters, typically lasers or light-emitting diodes (LEDs). These light signals travel through optical fibers or waveguides, which are made of materials that can efficiently guide and transmit light with minimal loss. At the receiving end, optical receivers convert the incoming light signals back into electrical signals that can be processed by electronic devices.

BRIEF SUMMARY

Some embodiments relate to a photonic device comprising a glass interposer comprising an optical network having one or more glass waveguides; and a plurality of photonic integrated circuits (PIC) attached to the glass interposer, at least one PIC of the plurality of PICs comprising an optical transceiver optically coupled to the optical network of the glass interposer and a plurality of electrical connections configured for coupling to one or more electronic chips.

In some embodiments, the glass interposer further comprises a through glass via (TGV) and the at least one PIC further comprises a through silicon via (TSV) electrically coupled to the TGV.

In some embodiments, the glass interposer further comprises a first redistribution layer (RDL) adjacent a first surface of the glass interposer and a second (RDL adjacent a second surface, opposite the first surface, of the glass interposer, wherein the first RDL is configured for connection to the at least one PIC and the second RDL is configured for connection to a substrate.

In some embodiments, the at least one PICs is mounted on the glass interposer at a first surface of the PIC, wherein the electrical connections are formed on second surface of the PIC opposite the first surface.

In some embodiments, the glass interposer defines a recess, and the first surface of the PIC is disposed in the recess, and wherein the optical transceiver of the at least one PIC is edge coupled to the optical network of the glass interposer.

In some embodiments, the glass interposer defines a recess, and the first surface of the PIC is suspended over the recess, and wherein the optical transceiver of the at least one PIC is evanescently coupled to the optical network of the glass interposer.

Some embodiments relate to a system comprising a plurality of photonic integrated circuits (PICs); and a multi-reticle glass interposer enabling optical communication between the PICs.

In some embodiments, at least one of the PICs is a multi-reticle PIC.

In some embodiments, the system further comprises a plurality of integrated circuit chips, each chip located on a different reticle of the PICs.

In some embodiments, the glass interposer includes glass waveguides coupling the PICs together.

In some embodiments, the glass interposer further comprises through-glass vias coupled to through silicon vias formed in the PICs.

In some embodiments, each of the plurality of PICs is obtained from a common wafer.

In some embodiments, the plurality of PICs are obtained from more than one wafer.

In some embodiments, each PIC is coupled to the glass interposer through evanescent coupling.

In some embodiments, the PICs comprises active photonic circuits and the glass interposer lacks active photonic circuits.

Some embodiments relate to a computing system comprising a glass interposer comprising an optical network having one or more glass waveguides; a plurality of photonic integrated circuits (PIC) attached to the glass interposer, the plurality of PICs comprising an optical transceiver optically coupled to the optical network of the glass interposer; and a plurality of electronic chiplets disposed on the plurality of PICs such that the plurality of PICs are disposed between the plurality of electronic chiplets and the glass interposer.

In some embodiments, the glass interposer further comprises through glass vias (TGV) and the PICs further comprise through silicon vias (TSV) electrically coupled to the TGVs.

In some embodiments, the plurality of PICs are obtained from more than one wafer.

In some embodiments, the glass interposer defines a recess, and at least one of the plurality of PICs is disposed in the recess, and wherein the optical transceiver of the at least one PIC is edge coupled to the optical network of the glass interposer.

In some embodiments, the computing system further comprises a voltage regulator (VR) module, wherein the glass interposer is disposed between the PICs and the VR module.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

Figure 1A:
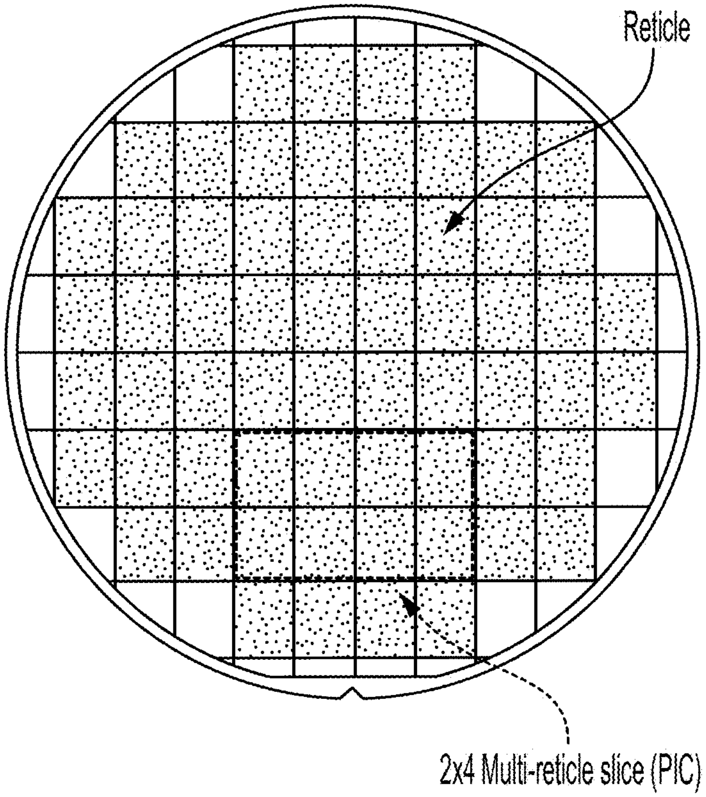
FIG. 1A illustrates a semiconductor wafer having multiple reticles, including a block of 2×4 reticles, in accordance with some embodiments.

Chip-on-optical-silicon solutions based on photonic interposers can be used to improve the bandwidth of chiplet die-to-die communications within an application specific integrated circuit (ASIC) package, enabling tight integration of multiple heterogeneous chiplets. Relative to conventional, electronic solutions, this approach improves communication bandwidth and latency across dies in that it enables communication anywhere in the die (not just at die edges) without restrictions due to electromagnetic interference (EMI). Further, this approach improves the yield of electronic dies in that it enables large chiplet dies to be split into smaller ones. Photonic interposers of these types include integrated photonic circuitry (e.g., photonic switches, transceivers, couplers and waveguides) configured to route signals in the optical domain in a programmable fashion.

The inventors have recognized and appreciated that this approach has challenges. First, it suffers from limited yield. To connect a significant number of chiplet dies together, the photonic interposer should be relatively large. To make it sufficiently large to be able to interconnect several chiplets, a photonic interposer is generally formed by combining together multiple contiguous reticle slices from an optical wafer. This is obtained using repeating reticle tiles. Yield issues arise because the performance of a photonic interposer depends on whether each one of these reticles yields. If at least one of these reticles does not yield (e.g., has manufacturing defects), the performance of the entire photonic interposer is compromised. Consider for example the wafer of FIG. 1A, which includes a grid of reticles. Multiple photonic interposers can be obtained from this wafer by slicing contiguous reticles. In this example, a photonic interposer is obtained by slicing a block of 2×4 reticles. The performance of the resulting photonic interposer depends on whether each reticle of the 2×4 element is defect-free. If at least one among these eight reticles does not yield, the performance of the entire photonic interposer is compromised. While it is possible to mitigate this yield issue using redundancy logic, this approach is limited and does not fully solve this problem.

Second, forming a photonic interposer by repeating reticles of a wafer limits the flexibility of the chiplet dies that can be placed on top of the interposer. This is because in most implementations the reticles of a wafer are identical to each other, thereby limiting the functionality that can be achieved using a photonic interposer.

Recognizing the susceptibility of conventional photonic interposers to yield, coupled with their limited flexibility, the inventors have developed architectures based on glass interposers. Glass interposers of the types described herein are used to photonically interconnect multiple smaller photonic integrated circuits (PIC), as opposed to using a single, larger PIC. The inventors have recognized and appreciated that the typical yield of a glass interposer is significantly higher than the yield of a PIC. This is because glass interposers are passive in nature, while PICs include active photonic elements. Active photonic components (e.g., photonic transceivers and switches) tend to be more susceptible to manufacturing defects than passive photonic components (e.g., waveguides and couplers) because active components require additional manufacturing steps (e.g., ion implantation, sputtering, epitaxial growth, etc.).

Figure 1B:
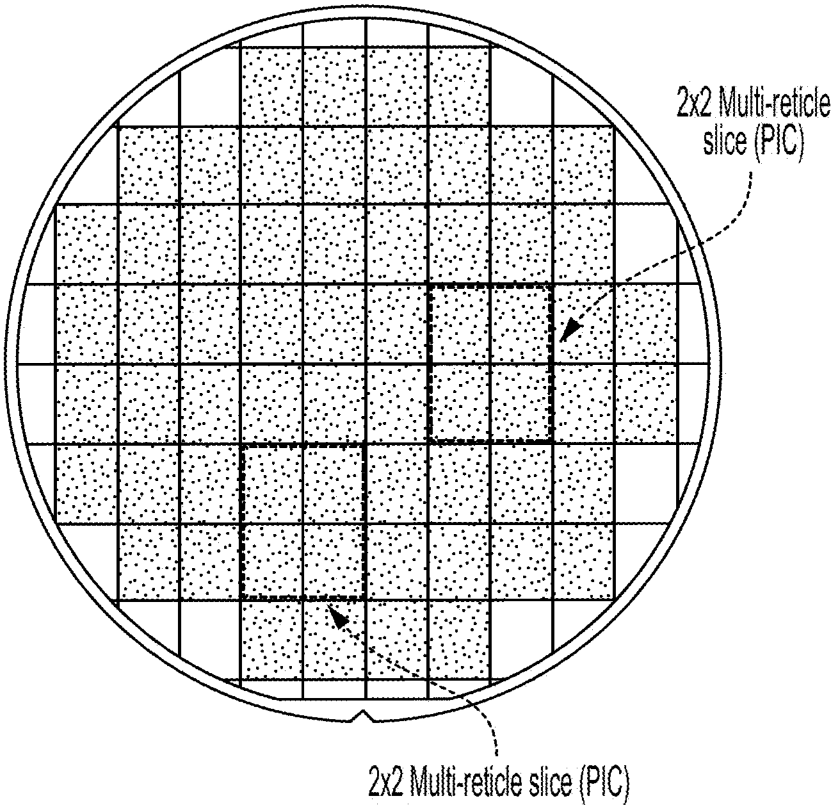
FIG. 1B illustrates a semiconductor wafer having multiple reticles, including two blocks of 2×2 reticles, in accordance with some embodiments.

This approach improves performance because instead of having to slice a large number of continuous reticles (as shown in FIG. 1A), one can pick and choose reticles known to have yielded. In the example of FIG. 1B, instead of a single PIC having eight contiguous reticles, two separate PICs may be obtained by slicing separate blocks of 2×2 reticles. While the switching ability of the PICs of FIG. 1B is largely the same as the switching ability of the PIC of FIG. 1A, yield performance is improved. This is because the likelihood of finding eight yielding reticles in a 4×2 arrangement is generally lower than the likelihood of finding eight yielding reticles in two distinct 2×2 blocks.

As a further advantage, using glass interposers in the manner described herein provides more flexibility than photonic interposer in that it enables use of PICs having different patterns. By contrast, in reticle-stitched photonic interposers, each reticle has the same pattern as the other reticles. This can be appreciated from FIG. 1C, in which a PIC is extracted from a first wafer and another PIC is extracted from another wafer. The wafers may be patterned with different layouts. The PICs maybe mounted together on a common glass interposer.

Figure 2A:
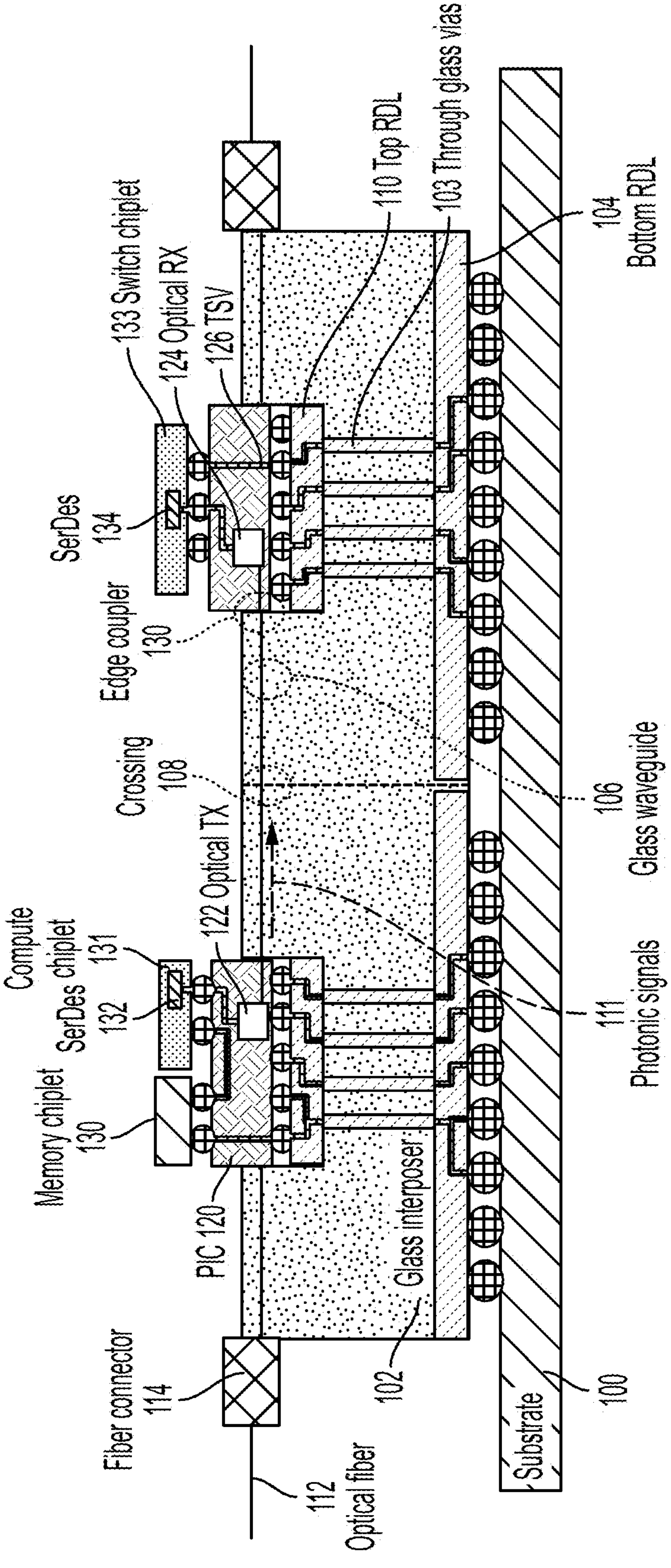
FIG. 2A is a cross sectional view of a photonic system including a glass interposer, in accordance with some embodiments.

FIG. 2A is a cross sectional view of a photonic system including a glass interposer, in accordance with some embodiments. Glass interposer 102 sits on top of substrate 100, and hosts one or more PICs 120. Light is provided to the PICs via an optical fiber 112, which optically couples to glass interposer via fiber connector 114. Electronic integrated circuits are disposed on top of the PICs. For example, a first PIC is depicted as having a memory chiplet 130 and a compute chiplet 131 disposed thereon, and another PTC is depicted as having a switch chiplet 131 disposed thereon. The package of FIG. 2A may connect other types of electronic integrated circuits with one another, including for example accelerators, graphic processing units, etc.

Glass interposer 102 may be made of any suitable type of glass, including for example $SiO_2$, fused silica, or borosilicate glass. The glass interposer may be passive in nature in that it may include passive optical devices (e.g., waveguides, passive couplers, waveguide crossings, wavelength multiplexers/demultiplexers, etc.) but may omit active optical devices (e.g., modulators, detectors, switches, etc.). Glass waveguides 106 may be used to route light from one part of the glass interposer to another, thereby forming a network optically coupling the PICs to each other. For example, FIG. 2A illustrates a photonic signal 111 traveling from one PIC to another. The waveguides may be made of any suitable material that is compatible with the technology used to fabricate the glass interposer. The waveguides can be made in-situ within the glass interposer itself with lithography or laser writing. In another embodiment, the waveguides and the passive optical components within the glass interposer can be manufactured using ion-exchange process. Different glass composition can necessitate the different manufacturing techniques. Further, the waveguides may be made of a material having a refractive index greater than the refractive index of the surrounding material, thus ensuring that the optical signal mode is sufficiently contained and guided within the waveguide. For example, the glass interposer may be made of $SiO_2$, and the waveguides may also be made of $SiO_2$ but doped in a way as to produce a larger refractive index, or may be made of silicon nitride. The silicon nitride can either be grown, deposited, or bonded.

A glass interposer may be fabricated using semiconductor manufacturing techniques. In one example, a glass interposer is patterned in accordance with a reticle-stitched arrangement. In such an arrangement, a step-and-repeat process produces multiple reticles as instantiations of the same photomask set. Each reticle may be patterned to have waveguides that optically couple to waveguides formed in the adjacent reticle. In FIG. 2A, crossing 108 represents the point where a waveguide crosses the boundary between adjacent reticles of the glass interposer.

In some embodiments, glass interposer 102 may be relatively thick along the vertical direction, although the thickness may be limited by the maximum length that can be obtained for TGVs using conventional fabrication techniques. For example, in some embodiments, the thickness of the glass interposer may be less than one inch (e.g., between 150 μm and 350 μm or between 250 μm and 350 μm). In other embodiments, the thickness may be between 1 inch and 20 inches, between 2 inches and 20 inches, between 5 inches and 20 inches, between 7.5 inches and 20 inches, between 10 inches and 20 inches, between 12.5 inches and 20 inches, between 15 inches and 20 inches, between 1 inch and 15 inches, between 2 inches and 15 inches, between 5 inches and 15 inches, between 7.5 inches and 15 inches, between 10 inches and 15 inches, between 12.5 inches and 15 inches, between 1 inch and 10 inches, between 2 inches and 10 inches, between 5 inches and 10 inches, or between 7.5 inches and 10 inches, to provide a few examples.

The PICs 120 are disposed within recesses formed on the top surface of glass interposer 120. This arrangement allows the waveguides of a PIC to be aligned (along the same axis) with the glass waveguides of the interposer, thereby forming an edge coupler 137. Edge couplers provide efficient optical coupling to and from the PICs. In contrast to glass interposer 102, the PICs may be active in nature in that they may include modulators, photodetectors and optical switches. In FIG. 2A, for example, one PIC is depicted as having an optical transmitter (TX) 122 and the other PIC as having an optical receiver (RX) 124. In this arrangement, data transmitted by optical TX 122 is conveyed to optical RX 124 via glass waveguides 106. In some embodiments, each PIC may have a transmitter and a receiver, thus allowing the PIC to handle data in both directions. Further, a PIC may be equipped with optical switches (not shown in FIG. 2A) to route data to (and from) any one among the chiplets disposed on that PIC.

The optical switching elements can change the topology of how the electronic chiplets are interconnected with one another. A particular topology that is most advantageous for one application may first be created, and may subsequently be changed in response to a request to run a different application. Some of the most common topologies include all-to-all, hypertoroid, ring, and tree.

The optical switching elements also allow for the use of redundant photonic elements within the PICs, to improve yield of the PIC. Two photonic devices can be connected to a switch. If one photonic device (e.g., TX, RX, or coupler) doesn't yield during fabrication or breaks during operations, the switch can be used to change the system to use the other yielding or still-good photonic element.

The optical TX and RX in the PICs can utilize wavelength-division multiplexing (WDM) where multiple wavelengths (e.g., spaced 50, 100 GHz, 200 GHz, or 400 GHz apart in dense WDM or >10 nm apart in coarse WDM) are transported over the same physical waveguide or optical fiber. The glass waveguides as well as the waveguides within the PIC can be compatible with dense or coarse WDM.

In some embodiment, the PICs may further include vertical grating couplers to couple light out directly (vertically) without passing through the glass interposer. These vertical grating couplers can be useful for testing the photonic devices in the PIC during the fabrication process.

If the PIC has been flip-chipped to the glass interposer, a vertical grating coupler can be exposed from the bottom side (top side is closest to the active silicon layer and bottom side is where the handle silicon layer is) by removing or thinning the silicon handle. The removal can be done either through grinding or etching.

Light sources—e.g., laser, LED, VCSEL, or ASE sources—can be integrated into the system through several ways. First, an external source can be coupled into the system through fibers which can be connected through the edge connector assembly or the vertical grating couplers on the PIC. Additionally, these laser sources can also be immediately flip-chip bonded on at least one PICs. In another embodiment, one of the PICs can be made in a III-V foundry process such that this particular PIC has gain materials for lasing or light amplification operations. Optical circuit switch and light distribution system within the PICs can be used to distribute the light sources from one entry point to multiple PICs and within a single PIC to multiple TX elements.

In the example of FIG. 2A, compute chiplet 131 includes a serializer/deserializer (SerDes) 132 and switch chiplet 133 includes a SerDes 134. These SerDes allow data to be serialized into optical channels, thereby enhancing the overall data rate supported by each optical channel.

Electronic signals from a compute chiplet may be sent to a PIC, using a TX SerDes, with data rate at 56-64 Gbps NRZ or 112 Gbps PAM-4, for example. A physical coding sublayer (PCS) may also be used. The PCS enables scrambling and DC balancing of the bits that may be required by some TX components, e.g., microring modulators. The SerDes may also include the analog front end for equalization including (but not limited to) feed-forward equalization (FFE) & continuous time linear equalization (CTLE) on the TX side (and decision feedback equalization (DFE) on the RX side). The equalization can invert the channel response to significantly reduce inter-symbol interference. The signals can be sent directly to a photonic TX modulator or can be further amplified (if the photonic transmitter element requires a higher voltage). On the RX side, the signals can then be received by an RX SerDes.

If the electronic chiplets do not use SerDes to communicate with the corresponding PIC, it may use a wide and parallel interface such as a bunch of wires, AIB, or UCIe for communication with the PIC. In some cases, these signals can be sent directly from the TX PIC to the RX PIC. Further, in some protocols, such as UCIe, the clock can be forwarded from the TX to RX components by wavelength multiplexing the signals and the clock within the same waveguides. However, in some embodiments, it may be desirable to build a SerDes shim that serializes the wide-and-parallel signals (that can be typically slow) into a single signal that is commensurate with the electrical bandwidth of the photonic TX and RX.

Through glass vias (TGV) 103 may be used to provide electrical access to the PICs from the substrate 100. The TGV include electrical conductors extending through the interposer along the vertical direction. A bottom redistribution layer (RDL) 104 provides electrical coupling between the TGVs and the underlying substrate. A top RDL 110 provides electrical coupling between the TGVs and the PICs. Micro-bumps (not labelled in FIG. 2A) connect top RDL 110 to the bottom surface of PIC 120. The RDLs may redistribute the input/output (I/O) connections of the PIC's native layout to a different layout, for example to match the requirements of the underlying substrate. This allows for more efficient routing of signals between the PICs and the package. The PICs may include through silicon vias (TSV) 126 to provide electrical power and signals to the chips disposed on the PICs. Electrical connections (e.g., BGA or LGA) provide an electrical interface between the PICs and the electronic chips.

In some embodiments, the number of layers in the top and the bottom RDLs are equal to each other due to manufacturing constraints, e.g., warpage of the glass. However, in other embodiments, the number of layers between the top and the bottom RDLs are different from each other. For example, because electrical routing already exists within the PIC 120, the number of necessary layers in the top RDL may be minimal. In another example, it may be desired to obviate the bottom RDL altogether if the pitch of the substrate 100 is already as fine/tight as the pitch of the through glass vias 103.

Figure 2B:
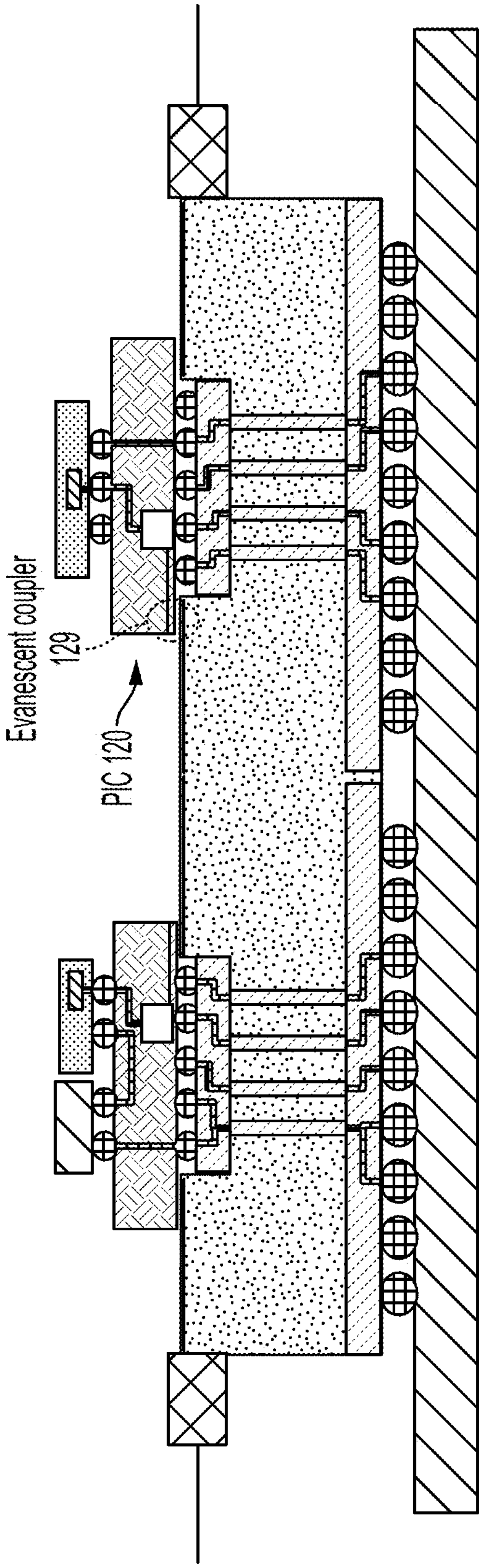
FIG. 2B is a cross sectional view of another photonic system including a glass interposer, in accordance with some embodiments.

The example of FIG. 2B differs from the example of FIG. 2A in that the PICs are disposed on the top surface of the glass interposer (as opposed to being in recesses). As a result, there is no alignment between the PIC waveguides and the glass waveguides. Instead, the PIC waveguides are coupled to the glass waveguides via evanescent couplers 129.

Another useful optical coupling methodology that is distinct from FIGS. 2A and 2B is via vertical coupling. In some embodiment, the vertical coupling is done by using grating couplers. In another embodiment, the vertical coupling is achieved by depositing microlenses and micromirrors in the PTC and in the glass interposer. Both technologies are compatible with one another as long as the optical modes have been engineered so as to enable efficient low-loss coupling. Importantly, different optical coupling methods can be used within a single system/package. For example, one waveguide can couple from the PIC to the glass interposer via edge coupling and another waveguide can couple via evanescent coupling.

In some other embodiment, the light source can also be integrated directly within the glass interposer without the need of the PIC in between. Coupling of the light sources to the glass interposer may use the same coupling methodology (evanescent coupling, edge coupling, vertical coupling) as that between the PIC and the glass interposer. The advantage of this direct coupling is that the polarization of the output light can be maintained within the glass (as compared to the need of using polarization-maintaining fiber). Further, coupling to waveguides means that the couplers can be packed in a tighter manner than the standard 127 μm or 250 μm for optical fibers.

Figure 2C:
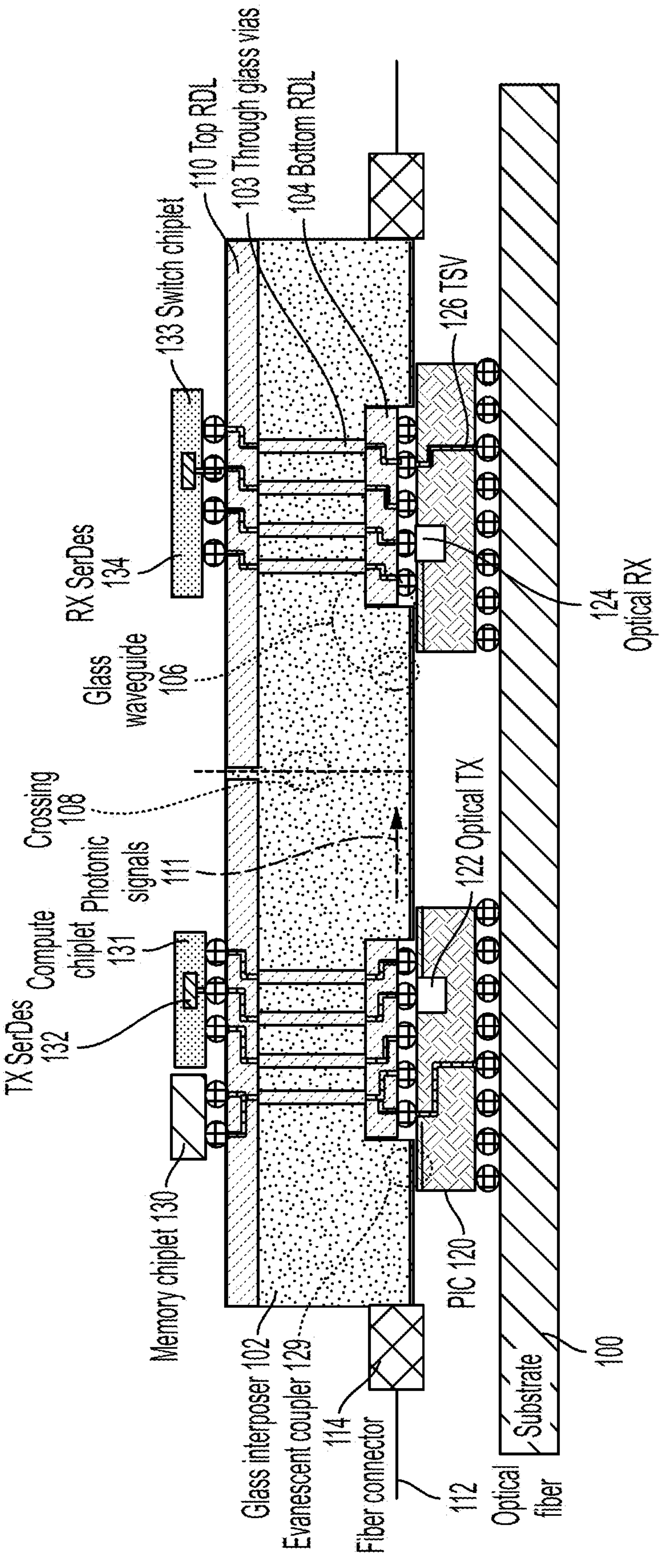
FIG. 2C is a cross sectional view of yet another photonic system including a glass interposer, in accordance with some embodiments.

The example of FIG. 2C differs from the example of FIG. 2A in that the PICs are disposed between substrate 100 and glass interposer 102. Electronic chips are disposed on the top surface of glass interposer 102. Optical coupling to and from the PICs is achieved via evanescent couplers 129, although solutions in which the PICs are positioned inside recesses formed on the bottom surface of the interposer are also possible (similar to FIG. 2A). In this example, the glass waveguides are near the bottom surface of the interposer, as opposed to being near the top surface as in FIG. 2A. From an operational standpoint, the package of FIG. 2C works largely in the same manner as the package of FIG. 2A. The glass waveguides provide optical connectivity among the PICs. The TSVs of the PICs and the TGVs of the interposer provide electrical access to the electronic chips.

Figure 2D:
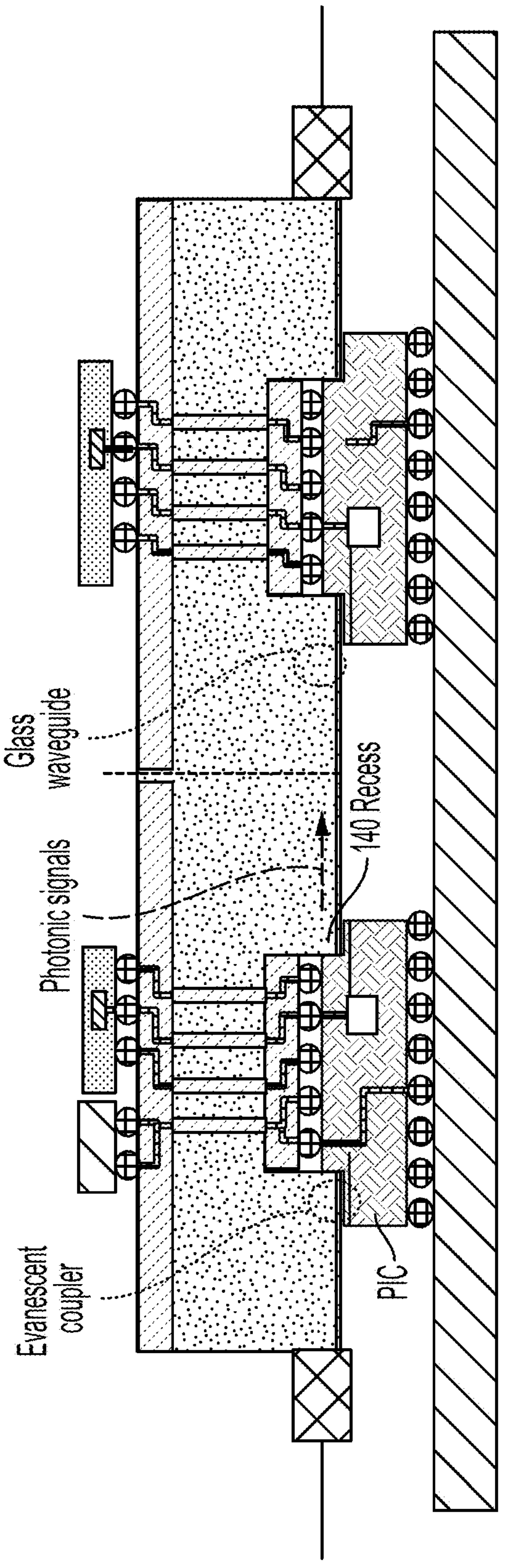
FIG. 2D is a cross sectional view of yet another photonic system including a glass interposer, in accordance with some embodiments.

The example of FIG. 2D differs from the example of FIG. 2C in that both the PICs and the interposer are provided with recesses (140). In this way, the bottom surface of the interposer sits on a depressed area of the top surface of the PICs. This arrangement facilitates evanescent coupling in that the PIC waveguides and the glass waveguides can be brought closer to each other.

Figure 2E:
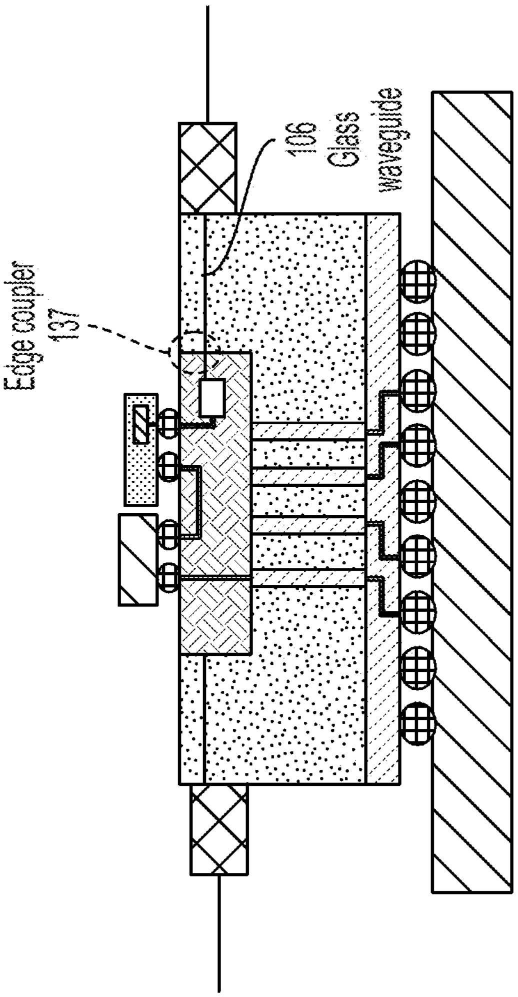
FIG. 2E is a cross sectional view of a bonded photonic system including an edge coupler, in accordance with some embodiments.
Figure 2F:
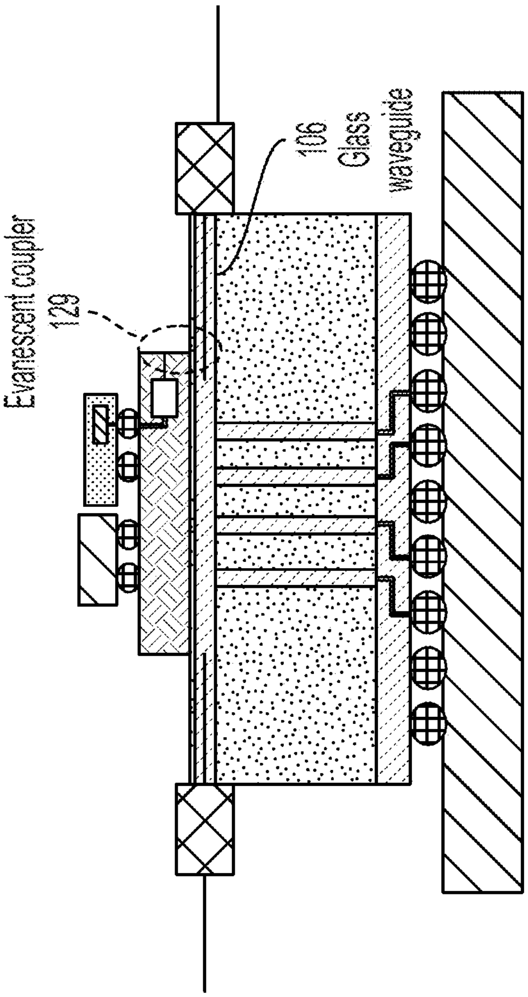
FIG. 2F is a cross sectional view of a bonded photonic system including an evanescent coupler, in accordance with some embodiments.

The packages illustrated in FIGS. 2A-2D can be manufactured via chip-on-wafer bonding, for example via thermal compression bonding. Such packaging process can produce tolerance in the 1 μm regime which is compatible with micro-bump (e.g., copper bumps) technology. In some embodiment, the same package can be manufactured with tighter tolerance via hybrid bonding. In this case, direct copper-to-copper connection is made without the use of bumps. Hybrid bonding enables tighter tolerance closer to the 0.1 μm regime. The tighter tolerance enables more efficient coupling and finer-pitch electrical connections. The package of FIG. 2E shows a package manufactured via hybrid bonding, where optical coupling between the PIC and the glass interposer is created via edge coupling. The finer pitch can enable direct attach from the TGV to the PIC (without having to use micro-bumps, in contrast to the package of FIG. 2A). FIG. 2F shows another package manufactured via hybrid bonding, where optical coupling is achieved via evanescent coupling. The technique enables wafer-to-wafer bonding (as well as chip-to-wafer bonding) which allows for the chips to be bonded on top of PIC 120 before PIC 120 is packaged with the glass interposer. As in FIG. 2E, the finer pitch can enable direct attach from the TGV to the PIC. Although the packages of FIGS. 2E-2F are shown as having only one PIC bonded thereto, the illustrated glass interposers may support multiple PICs, similar to the arrangements shown in FIGS. 2A-2D.

In some embodiments, the PICs 120 may be attached to a glass interposer 102 via glass welding, although other techniques are also possible. Nano-welding or micro-welding of glass allows glass to be attached to other glass, metals, silicon, or other materials. The welding can be done using laser welding where high-power, ultrashort-pulse lasers are aimed at the spots to be welded. In some embodiment, PICs 120 can be welded at locations away from or around the usable photonic elements. The locations of the welds can allow for precise alignment of PICs 120 to the glass interposer 102.

Figure 3A:
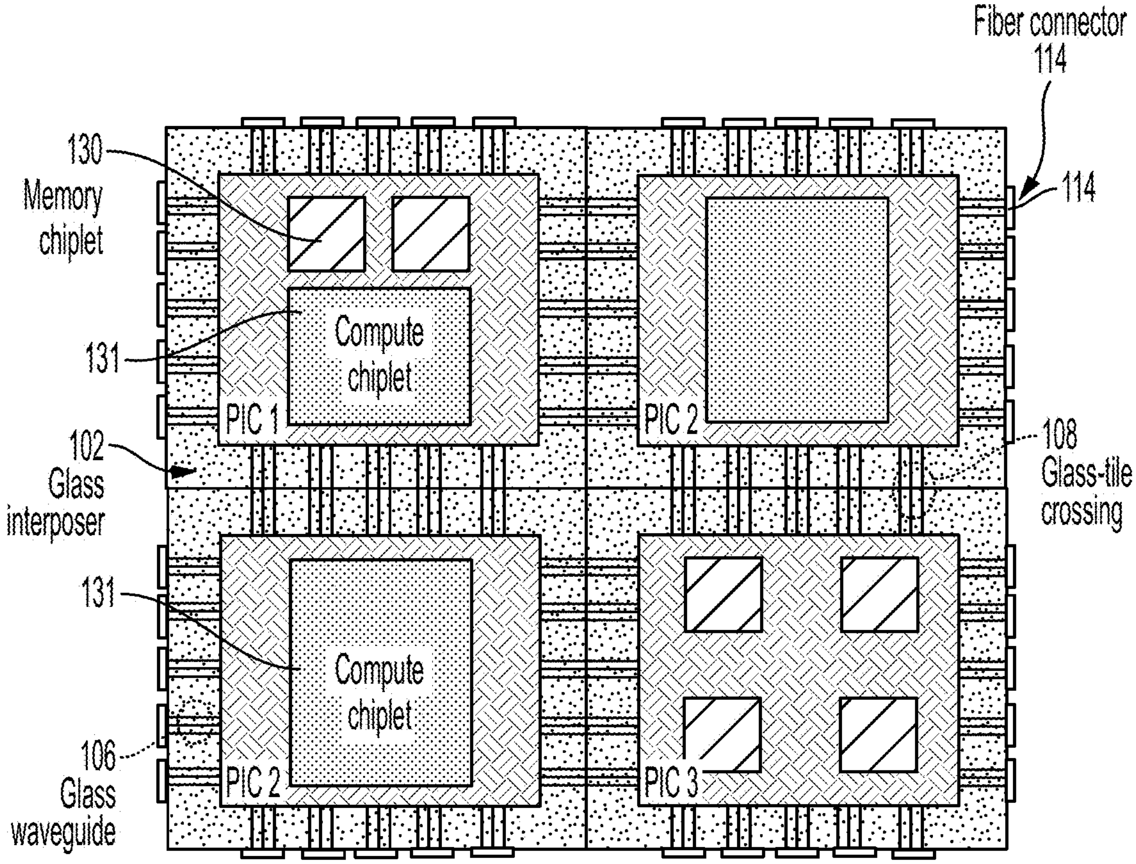
FIG. 3A is a top view of a photonic system including a glass interposer, in accordance with some embodiments.
Figure 3B:
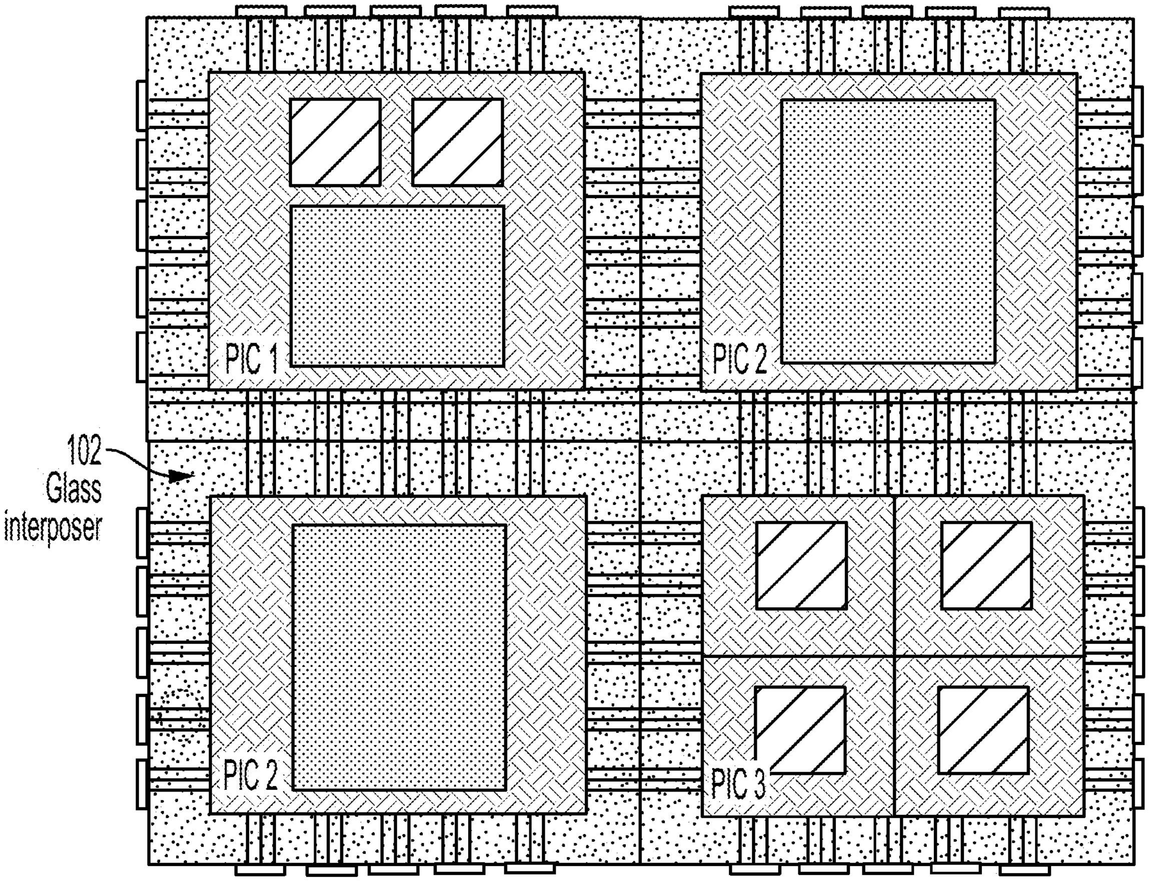
FIG. 3B is a top view of another photonic system including a glass interposer, in accordance with some embodiments.
Figure 3C:
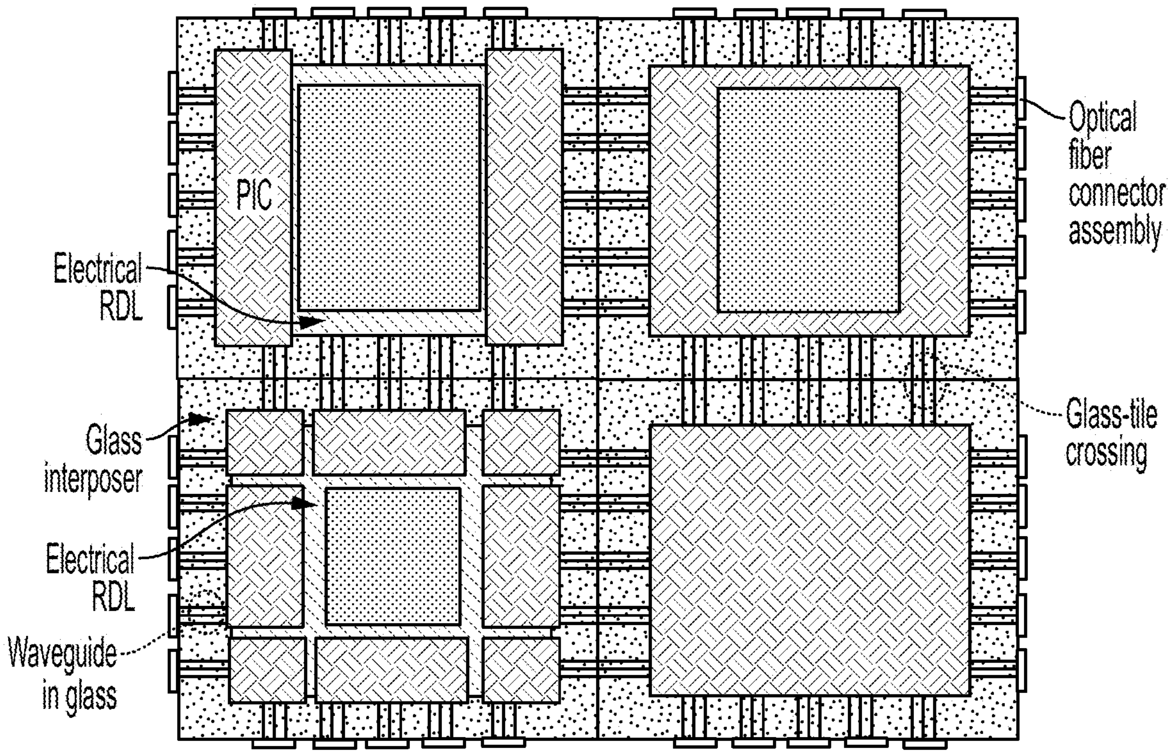
FIG. 3C is a top view of yet another photonic system including a glass interposer, in accordance with some embodiments.

FIGS. 3A, 3B and 3C provide examples of photonic systems that may be obtained using the photonic interposers described herein. In these examples, the glass has interposer can be viewed as having four quadrants, although other arrangements are also possible. These photonic systems may be arranged in accordance with any of the cross sections shown in FIGS. 2A-2D, as well as other cross sections not shown herein.

As can be appreciated from these examples, the glass interposers described herein enable photonic systems that combine PICs of different layouts. This is in contrast with some conventional reticle-stitched active photonic interposers, in which all the tiles share the same layout. The result is increased flexibility from a system architecture perspective. In the example of FIG. 3A, a glass interposer 102 hosts PICs of three different types (one PIC 1, two PICs 2, and one PIC 3). PIC 1 hosts one compute chiplet 131 and two memory chiplets 130. PICs 2 host one compute chiplet 131 each. PIC 3 hosts four memory chiplets 130. To give the different PIC types the ability to connect to different chiplet arrangements, the optical network patterned inside the different PIC types may be different from one another. This means that the PICs may be taken from different wafers.

The system allows for the electronic signals from each of the compute/switch/memory chiplets to be communicated to another compute/switch/memory chiplet in another glass reticle to be sent photonically. In some embodiments, the different PICs can be made in different processes (such that no identical mask set is used). For example, PIC 1 can be a silicon photonic PIC, PIC 2 can be a silicon nitride PIC, while PIC3 can be a PIC made in a III-V process (e.g., InP). In another embodiment, the size of PICs 1-3 can be larger than a single reticle and multi-reticle waveguide crossings can be used to connect the photonic elements between two adjacent reticles. It is also possible to have all the PICs placed in the multi-reticle glass system to be made with the same mask sets. The steps to create the system allows for only known yielding PIC dies to be packaged into the system.

In some embodiments, a PIC is fabricated in a process with optical amplification such as semiconductor optical amplifiers (SOAs). The PIC can either be made in a silicon photonics foundry and later III-V materials are deposited, or the PIC can be made directly in a III-V foundry. The SOAs can amplify optical signals that pass through this glass tile to counteract any optical losses in the system. The SOAs can also counteract the optical losses expected for signals exiting the system through optical fiber channels that are expected to be lossy or for signals arriving at the system that must be amplified to the sensitivity of the optical RX components. The SOAs can also be used to create lasers as a light source for the system.

The system of FIG. 3B differs from the system of FIG. 3A in that PIC 3 includes four reticles 230 supporting the memory chiplets, as opposed to having a single reticle shared among all the memory chiplets as in FIG. 3A. Again, this illustrates that glass interposers of the types described herein allow the PICs to form various computer architectures.

FIG. 3C illustrates yet another architecture based on a glass interposer. The north-western quadrant of the glass interposer hosts two PICs and a compute chiplet. The PICs are disposed on an electrical RDL. Each PIC may host additional chiplets, such as memory, compute and/or switch chiplets, for example in the arrangement shown in FIGS. 2A-2D.

Notably, the compute chiplet is disposed on the electrical RDL. This means that communication to and from the compute chiplet is performed in the electrical domain through the electrical RDL. To allow this, the PIC may be flip-chip bonded to the top RDL, without having to rely on TSVs. By contrast, the compute chiplet positioned on the north-eastern quadrant is disposed on a PIC. This means that communication to and from the compute chiplet is performed in the optical domain. The arrangement of the south-western quadrant is similar to that of the north-western in that it includes a compute chiplet and PICs on an electrical RDL. The difference is that this quadrant includes eight PICs organized on the periphery of the electrical RDL. Lastly, the south-eastern quadrant includes a single PIC spanning the entire reticle of the glass interposer. In this case, the PIC can be flip-chip bonded on top of the metal layer on the glass. It may not be necessary to include an RDL layer because the metal layers in the PIC can act as an RDL themselves.

In some embodiment, a reticle of the glass interposer may include electronic chiplet without PICs disposed thereon. Instead, the chiplets communicate with the neighboring chiplets using the substrate 100.

Figure 4A:
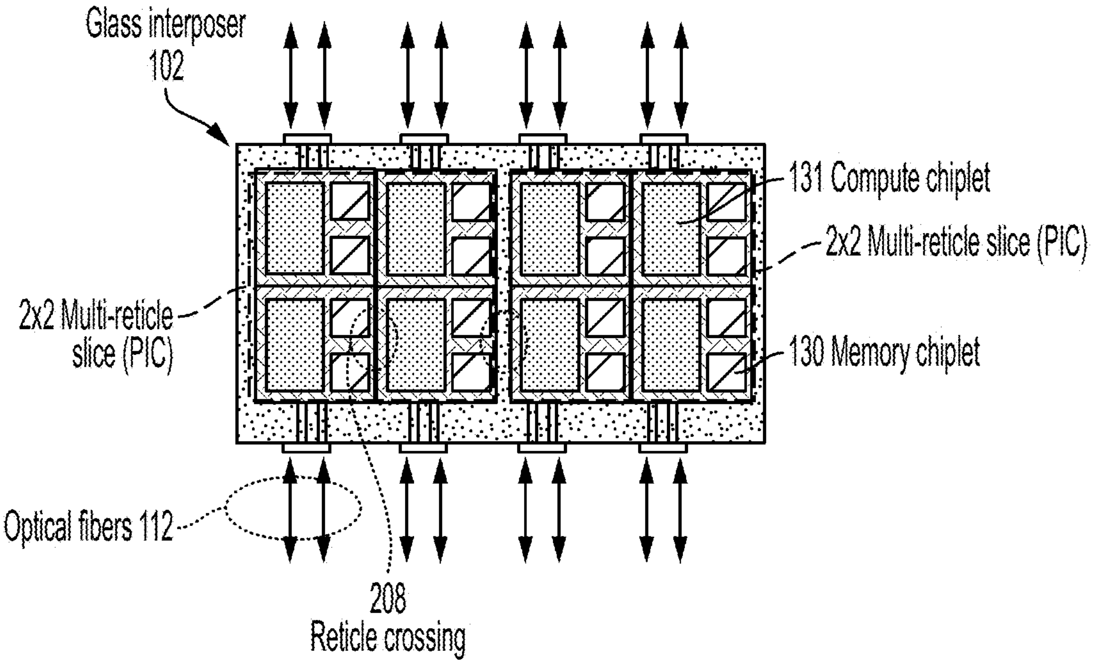
FIG. 4A is a top view of a photonic system including a glass interposer and a pair of 2×2 reticle photonic integrated circuits (PIC), in accordance with some embodiments.

As discussed above, using glass interposers of the types described herein improves upon conventional active photonic interposers because they can improve system yield significantly. This can be appreciated from the examples of FIGS. 4A-4B. The example of FIG. 4A illustrates a glass interposer with two PICs having 2×2 reticles each. As a result, the system includes eight reticles in total. This system can be said to have yielded when all the reticles lack significant defects that could otherwise compromise the integrity of the system. For that to happen, one has to identify at least two yielding 2×2 blocks on a wafer (as shown in FIG. 1B). An equivalent architecture using conventional, active photonic interposers would require a block of 4×2 reticles to achieve similar performance. Identifying one yielding 4×2 blocks on a wafer is generally less likely to occur than identifying two yielding 2×2 blocks on the same wafer. For this reason, the overall yield is improved.

In the example of FIG. 4A, each reticle of each PICs hosts one compute chiplet and two memory chiplets. The PICs are reticle-stitched in that one reticle of a PIC is optically coupled (e.g., via reticle crossings 208) to the adjacent reticles of that PIC. The glass interposer may also be reticle-stitched in that one reticle of the interposer is optically coupled (e.g., via glass tile crossings 108) to the adjacent reticles of the interposer. In this example, one PIC is positioned in correspondence with one reticle of the interposer and the other PIC is positioned in correspondence with another reticle of the interposer.

Figure 1C:
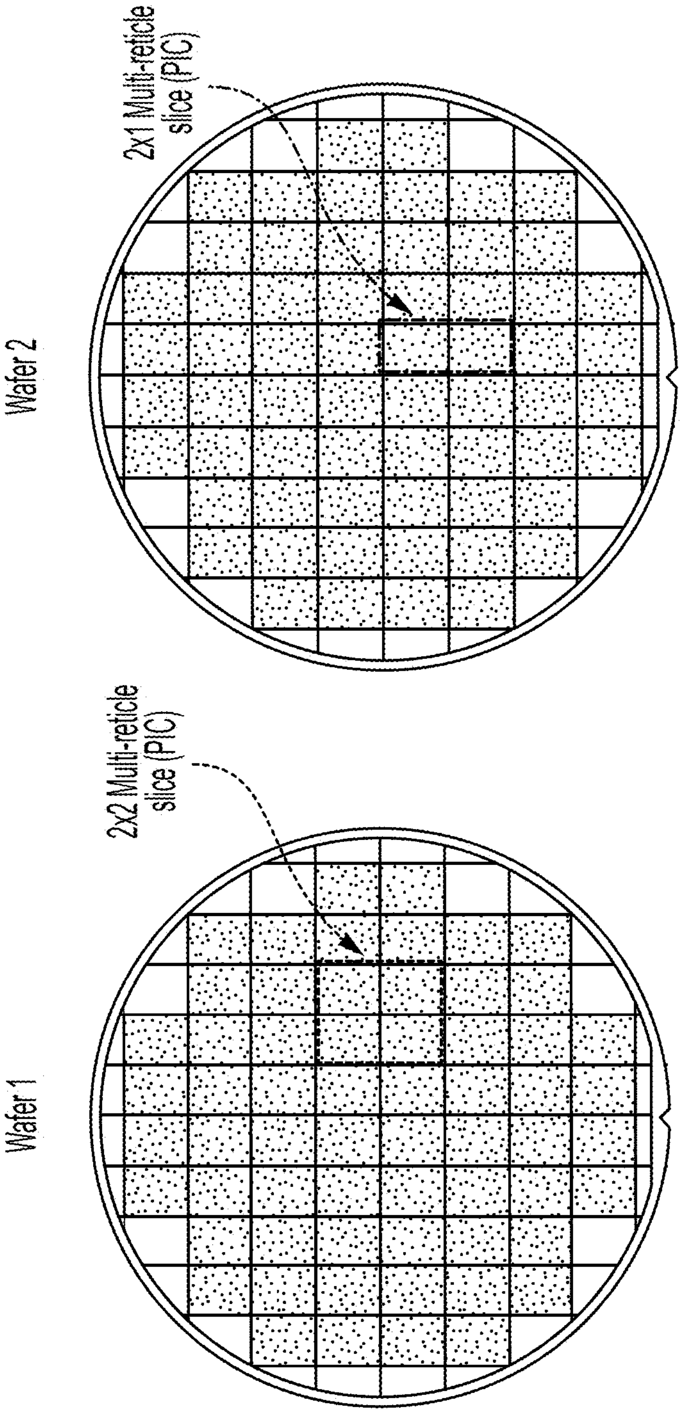
FIG. 1C illustrates two semiconductor wafers, one including a block of 2×2 reticles and the other including a block of 2×1 reticles, in accordance with some embodiments.
Figure 4B:
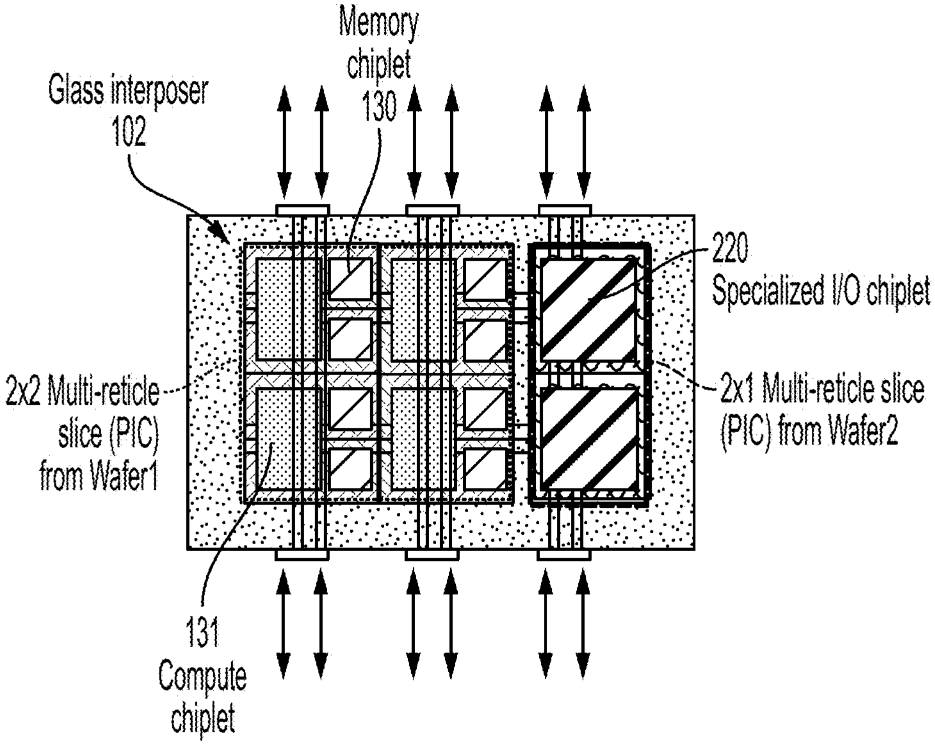
FIG. 4B is a top view of a photonic system including a glass interposer, a 2×2 reticle PIC and a 2×1 reticle PIC, in accordance with some embodiments.

The example of FIG. 4B differs from the example of FIG. 4A in that instead of having two 2×2 PICs, the glass interposer includes one PIC with 2×2 reticles and one PIC with 2×1 reticles. The PICs may be obtained from different wafers in some embodiments (as shown in FIG. 1C). As a result, the PICs may be patterned with different photonic network layouts. In this example, the first PIC includes compute chiplets and memory chiplets, while the second PIC includes specialized input/output (I/O) chiplets 220.

Figure 5A:
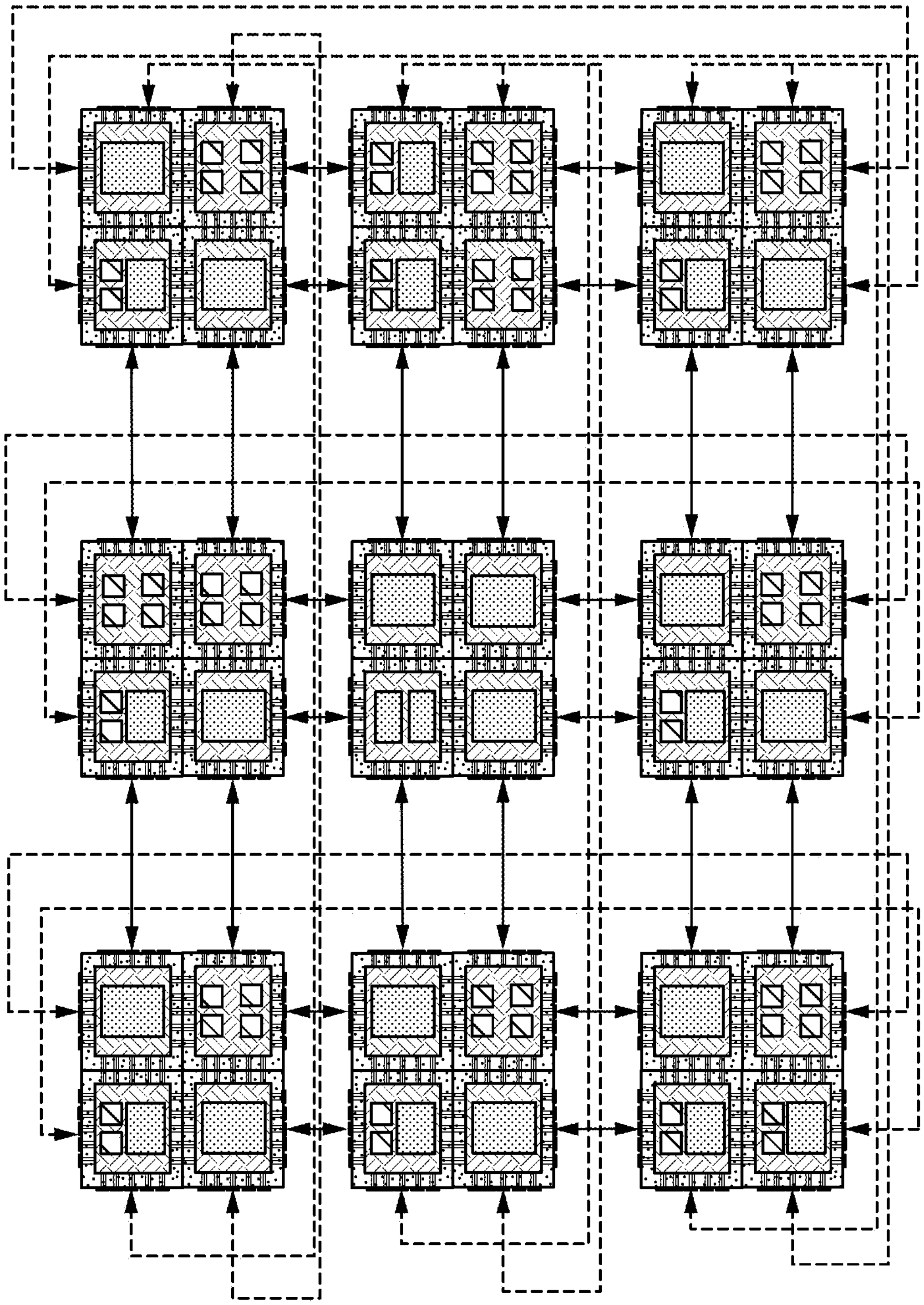
FIG. 5A is a top view of a computing system including multiple interconnected glass interposers, in accordance with some embodiments.

FIG. 5A illustrates an example of how multiple glass interposers may be connected to create a large, high-performance computing cluster. Interconnection between glass interposers may be achieved using optical fibers (e.g., single-mode, polarization-maintaining, or multimode fibers; single-core or multi-core fibers) or using free-space optics (e.g., where the PICs can emit and receive light by using grating couplers, either a single one or a phased array). In some embodiments, each glass interposer is identical to the other interposers. In other embodiments, all (or at least some) of the glass interposers is uniquely arranged relative to the other interposers. Additionally, using an electronic switch/router chiplet, the signals from one compute chiplet can be redirected to the correct photonic TX/RX devices.

Optionally, a glass interposer can incorporate SOAs within a single reticle or within the fiber connector assembly to withstand the losses expected from the PIC, glass waveguide, and the optical fibers.

It is also important to note that the photonic signals arriving at one PIC may not necessarily be detected there. The signals may be rerouted to another location on the interposer before being detected using the built-in optical flow switches within one or more PICs.

Figure 5B:
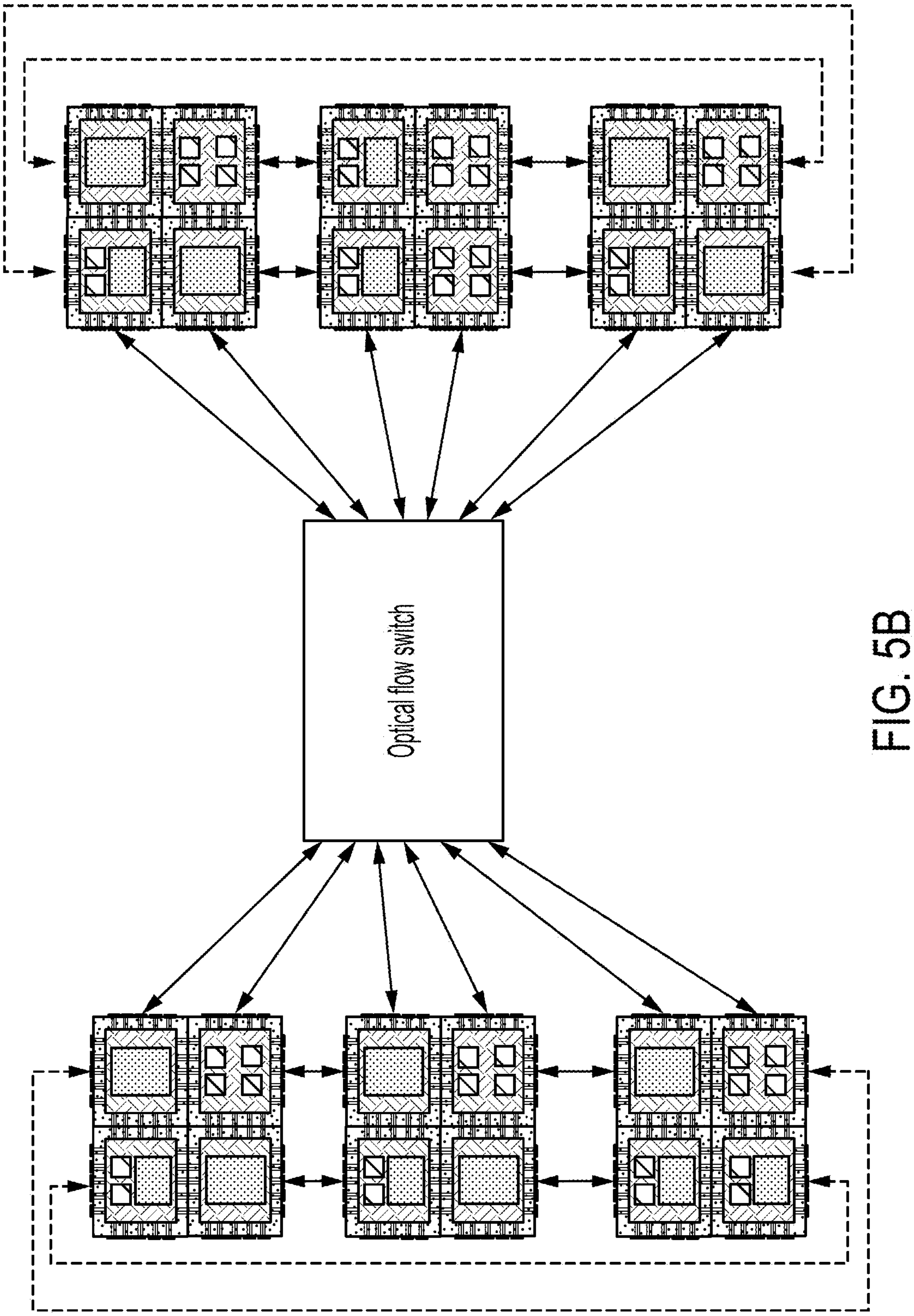
FIG. 5B is a top view of a computing system including multiple glass interposers interconnected using an optical flow switch, in accordance with some embodiments.

In some embodiments, a computing system of the types described herein may be interconnected together by an external optical flow switch (see FIG. 5B). The optical flow switch can be made out of MEMS, MEMS mirrors, piezo-controlled, photonic integrated circuits with spatial waveguide switches (e.g., MZIs) and/or wavelength switches (e.g., resonator based switches), robotic arms that plug and unplug fiber optic cables. In some embodiments, the optical flow switch is made with multi-reticle PICs that create a switch with butterfly topology, Clos topology, hypercube topology, Benes topology, Cantor topology, tree-based topology, or hypertoroid topology. In some embodiments, the optical flow switch detects the light arriving at the flow switch, performs switching electronically within an electronic switch device, and regenerates a new set of signals based on the detected light to be sent out of the switch. An optical flow switch may be combined with the architecture of FIG. 5A, where some connections are made directly between interposers and some connections are brokered by the optical flow switch. The external optical flow switch may also include SOAs to compensate for the losses of the optical flow switch. The switch may also further include laser light sources and wavelength MUX/DEMUX capabilities.

Figure 6:
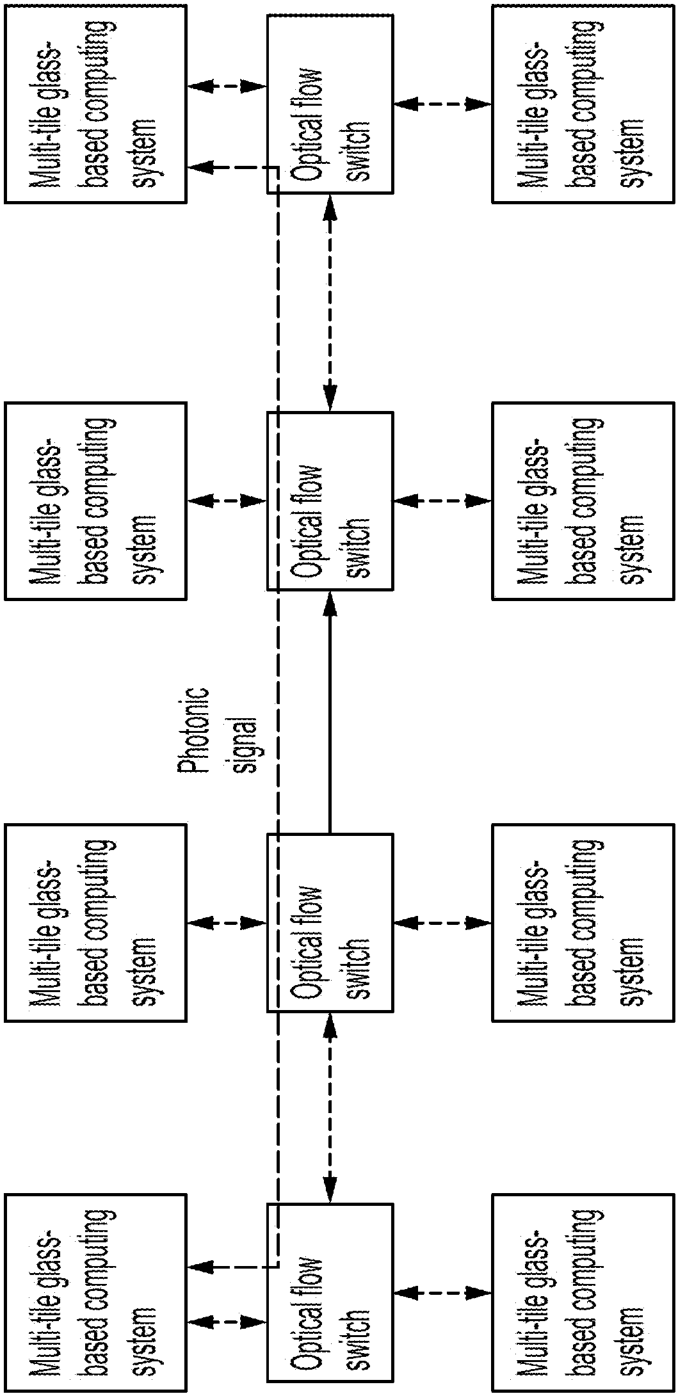
FIG. 6 is a block diagram of a computing system including multiple glass interposers interconnected using optical flow switches, in accordance with some embodiments.

In some embodiments, a flow switch device may be connected to one or more other flow switches such that a photonic signal originating from one interposer can be rerouted multiple times by multiple optical flow switches before being received by another interposer. This arrangement is depicted in FIG. 6.

Figure 7:
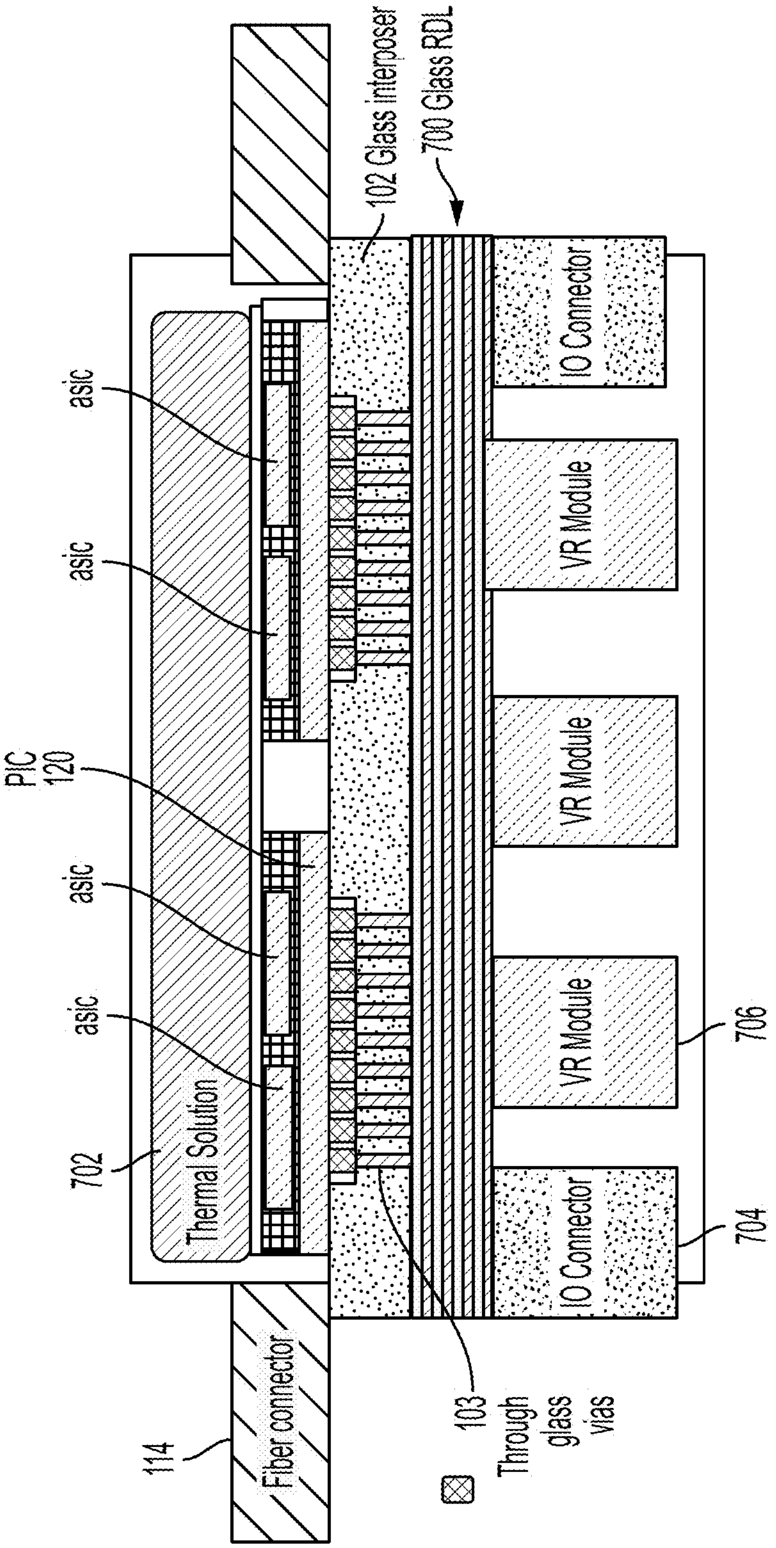
FIG. 7 is a cross sectional view of a photonic system including a glass interposer and multiple power modules, in accordance with some embodiments.

In some embodiments, wafer-level packaged stacked dies can directly bond to glass. At the same time, the electrical connections may be fanned out on the backside using organic or inorganic RDL. An example of this arrangement is depicted in FIG. 7. In this example, the TGVs (103) and RDL (700) can be processed before attaching die stacks (PIC in combination with electric chiplets) to the interposer. In this case, instead of performing a face-to-face bond for PIC to electronic chiplet, a face-to-back bond can be performed. As a result, the photonics are flipped. On the bottom side of the package are disposed I/O connectors 704 and voltage regulator (VR) modules 706. I/O connectors 704 provide signals from the bottom side of the package. Similarly, VR modules 706 provide regulated power from the bottom side of the package.

Figure 8A:
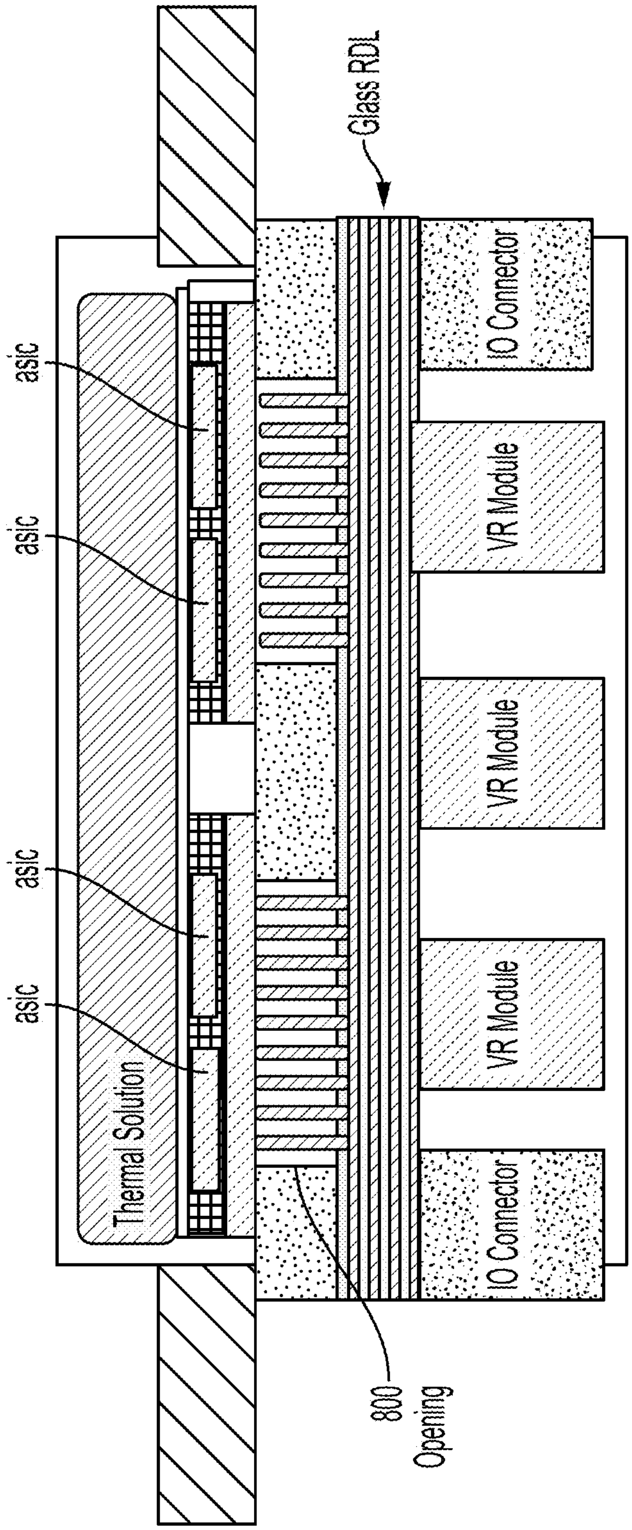
FIG. 8A is a cross sectional view of a photonic system including a through hole glass interposer, in accordance with some embodiments.
Figure 8B:
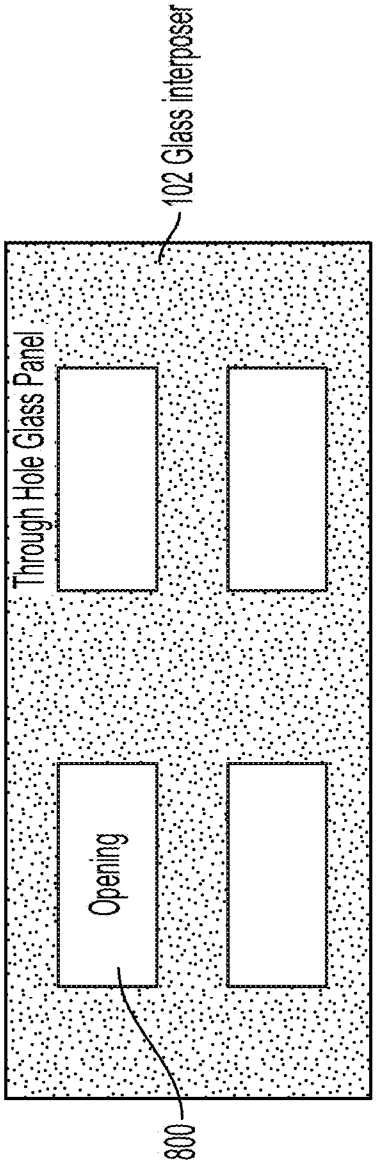
FIG. 8B is a top view of the through hole glass interposer of FIG. 8A, in accordance with some embodiments.

In some embodiments, a bundle of connections passing through openings formed on a glass interposer may be used in lieu of TGVs. This alternative arrangement is depicted in FIGS. 8A-8B. As shown, an opening 800 is defined through a glass interposer. The opening is sufficiently large to permit passage of several connections (e.g., copper pillars) through it. The connections electrically couple the bottom RDL to the PICs. FIG. 8B illustrates a cross section of a glass interposer having such openings 800. This arrangement has the advantage of performing die bond on a relatively flat panel and early in the assembly process.

Figure 9:
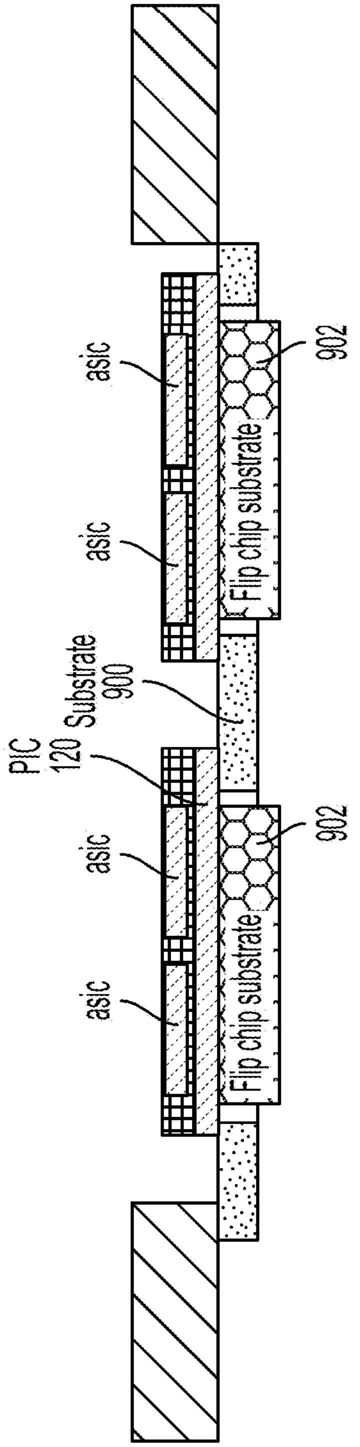
FIG. 9 is a cross sectional view of a photonic system including flip chip substrates, in accordance with some embodiments.

The arrangement of FIG. 9 also relies on an opening through the glass interposer. However, in this case flip-chip substrates 902 are inserted directly into the openings, thereby providing direct electrical connection to the PICs. Flip-chip substrates 902 may be supported by a larger substrate 900.

Figure 10:
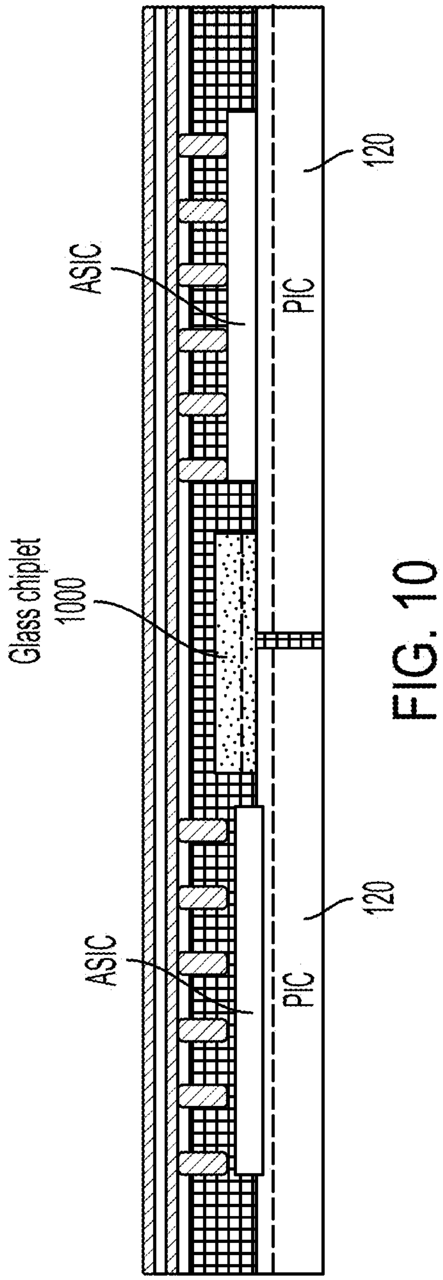
FIG. 10 is a cross sectional view of a photonic system including a glass photonic chiplet, in accordance with some embodiments.

In the arrangement of FIG. 10, glass photonic chiplets 1000 are used in lieu of a glass interposer of the types described herein. Glass chiplets 1000 include glass waveguides that provide optical bridging between adjacent PICs. Coupling between the PIC waveguides and the glass waveguide may be performed evanescently, as shown in the example of FIG. 10. Glass chiplets 1000 may share the same characteristics described above in connection with glass interposer 102, including its composition, but may be smaller.

Figure 11:
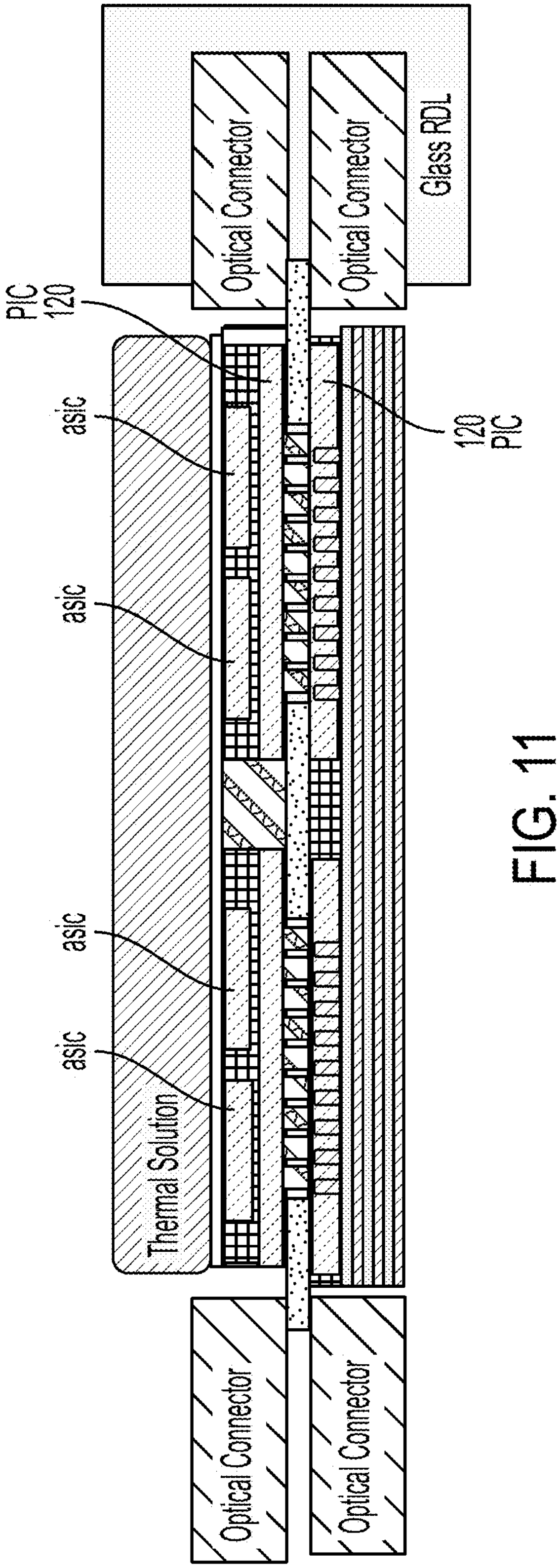
FIG. 11 is a cross sectional view of a photonic system including PICs disposed on both sides of a glass interposer, in accordance with some embodiments.
Figure 12:
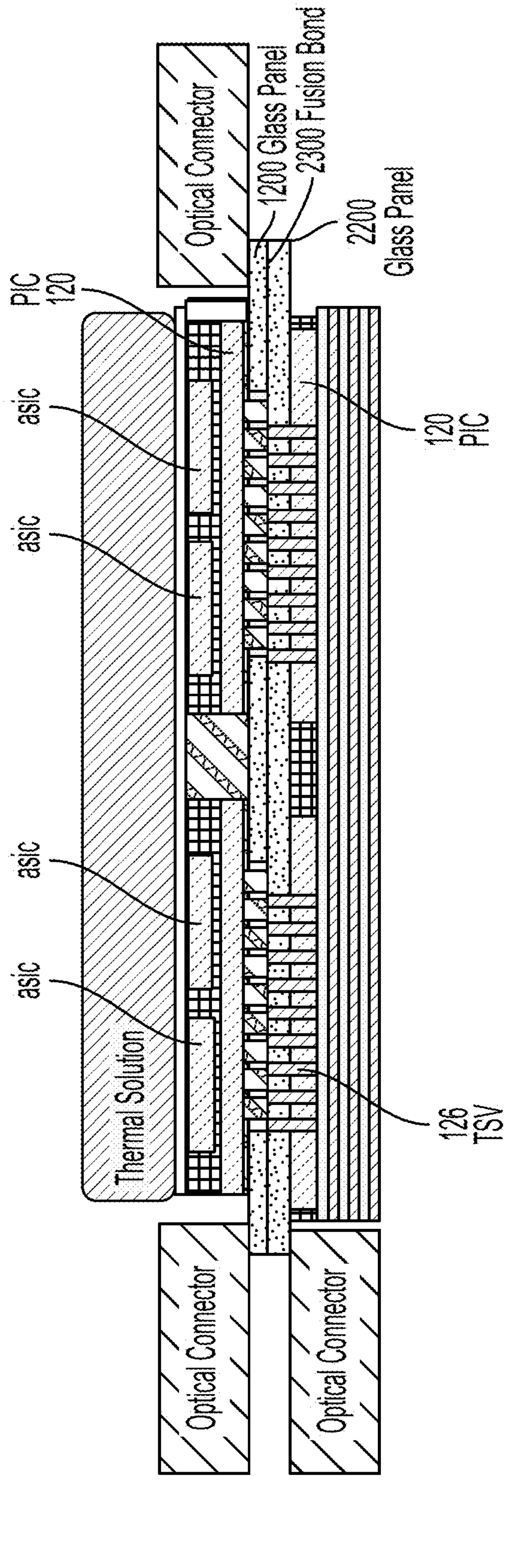
FIG. 12 is a cross sectional view of a photonic system including PICs disposed on both sides of a glass interposer, in accordance with some embodiments.

In the arrangement of FIG. 11, PICs of the types described above can be disposed on both sides of a glass interposer. The benefit is that the overall bandwidth coming out of the package can be increased significantly (e.g., can be doubled). RDLs can be used to make connection to the PICs in the manner described above. Fiber connectors provide access to the PICs on both sides of the interposer. Additionally, in some embodiments, multiple levels of glass waveguides can be provided, thereby increasing the ability of the package to route signals. This can be accomplished by fusion bonding, as illustrated in the example of FIG. 12. In this case, two glass panels (1200, 2200) are fused with each other (see fusion bond 2300). Each panel may include a layer of glass waveguides. The waveguides of the top panel may couple (e.g., evanescently) to waveguides in a PIC on the top side of the package. The waveguides of the bottom panel may couple (e.g., evanescently) to waveguides in a PIC on the bottom side of the package.

In further embodiments, the glass interposer may include passive optical circuits such as wavelength multiplexers and demultiplexers. These can be manufactured via arrayed waveguide gratings within the interposer or via resonant devices such as optical rings or racetracks. The glass interposer can also fan out waveguides at tighter pitch (<10 μm) with smaller modes within the PIC to waveguides of larger pitch (127 μm or 250 μm) with larger modes that may be compatible with the fiber connectors at the edges. Further, the waveguides within the glass interposer can be written in a 3D manner such that some waveguides can stay at the same vertical height and some waveguides can go up and down to different vertical heights. This makes it compatible with multi-fiber optical connectors that may have multiple rows of fibers at different heights. Also, some optical connectors may have pins that help the alignment of the fibers and the glass waveguides. Precise holes for those pins can also be manufactured within the glass interposer. In this case, the optical connector acts as the male connector while the glass interposer acts as the female connector.

In some embodiments, glass pins can be precisely welded on the surface of the glass interposer to enable the glass as a male connector. Two glass interposers can be plugged together if one has the male connections and another has the female connections. The optical coupling between one glass interposer and another glass interposer can be enabled via the same waveguides that enable coupling between the glass interposer and fiber optical connectors.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic device, comprising:

a glass interposer comprising an optical network having one or more glass waveguides, wherein the glass interposer defines a recess; and a plurality of photonic integrated circuits (PIC) attached to the glass interposer, at least one PIC of the plurality of PICs comprising an optical transceiver evanescently optically coupled to the optical network of the glass interposer and a plurality of electrical connections configured for coupling to one or more electronic chips, wherein the at least one PIC is mounted on the glass interposer at a first surface of the PIC, wherein the first surface of the PIC is suspended over the recess.

2. The photonic device of claim 1, wherein the glass interposer further comprises a through glass via (TGV) and the at least one PIC further comprises a through silicon via (TSV) electrically coupled to the TGV.

3. The photonic device of claim 2, wherein the glass interposer further comprises a first redistribution layer (RDL) adjacent a first surface of the glass interposer and a second (RDL adjacent a second surface, opposite the first surface, of the glass interposer, wherein the first RDL is configured for connection to the at least one PIC and the second RDL is configured for connection to a substrate.

4. The photonic device of claim 1, wherein the electrical connections are formed on second surface of the PIC opposite the first surface.

5. The photonic device of claim 1, wherein the optical transceiver is configured for wavelength-division multiplexing.

6. The photonic device of claim 1, wherein the glass interposer lacks active optical devices.

7. The photonic device of claim 1, wherein the at least one PIC further comprises an optical switch configured to change a topology of interconnection between the one or more electronic chips.

8. A system comprising:

a plurality of photonic integrated circuits (PICs), wherein each PIC comprises a transceiver and electrical connections configured for coupling to one or more electronic chips, and wherein each PIC defines a first surface; and a multi-reticle glass interposer enabling optical communication between the PICs through an optical network, wherein each PIC is mounted on the multi-reticle glass interposer at the first surface, wherein each reticle of the multi-reticle glass interposer defines a recess, wherein the first surface of each PIC is suspended over a respective recess, and wherein the transceiver of each PIC is evanescently coupled to the optical network of the multi-reticle glass interposer.

9. The system of claim 8, wherein at least one of the PICs is a multi-reticle PIC.

10. The system of claim 9, further comprising a plurality of electronic chips, each chip located on a different reticle of the PICs.

11. The system of claim 8, wherein the optical network includes glass waveguides evanescently coupled to the transceivers of the PICs.

12. The system of claim 8, wherein the glass interposer further comprises through-glass vias coupled to through silicon vias formed in the PICs.

13. The system of claim 8, wherein each of the plurality of PICs is obtained from a common wafer.

14. The system of claim 8, wherein the plurality of PICs are obtained from more than one wafer.

15. The system of claim 8, wherein the PICs comprises active photonic circuits and the glass interposer lacks active photonic circuits.

16. A computing system, comprising:

a glass interposer defining a plurality of recesses and comprising an optical network having one or more glass waveguides;

a plurality of photonic integrated circuits (PIC) attached to the glass interposer at respective first surfaces of the plurality of PICs, each of the plurality of PICs comprising an optical transceiver evanescently optically coupled to the optical network of the glass interposer, wherein the first surface of each PIC is suspended over a respective recess of the plurality of recesses; and a plurality of electronic chiplets disposed on the plurality of PICs such that the plurality of PICs are disposed between the plurality of electronic chiplets and the glass interposer.

17. The computing system of claim 16, wherein the glass interposer further comprises through glass vias (TGV) and the PICs further comprise through silicon vias (TSV) electrically coupled to the TGVs.

18. The computing system of claim 16, wherein the plurality of PICs are obtained from more than one wafer.

19. The computing system of claim 16, further comprising a voltage regulator (VR) module, wherein the glass interposer is disposed between the PICS and the VR module.

20. The computing system of claim 16, wherein the optical transceiver is configured for wavelength-division multiplexing.

* * * * *